United States Patent
Kahlbaugh et al.

(10) Patent No.: US 6,521,321 B2
(45) Date of Patent: *Feb. 18, 2003

(54) FILTER MATERIAL CONSTRUCTION AND METHOD

(75) Inventors: Brad Kahlbaugh, Roseville, MN (US); Denis J. Dudrey, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 46 days.

This patent is subject to a terminal disclaimer.

(21) Appl. No.: 09/756,328

(22) Filed: Jan. 8, 2001

(65) Prior Publication Data

US 2001/0003082 A1 Jun. 7, 2001

Related U.S. Application Data

(63) Continuation of application No. 08/935,103, filed on Sep. 29, 1997, now Pat. No. 6,171,684, which is a continuation-in-part of application No. 08/859,221, filed on May 20, 1997, now Pat. No. 6,165,572, which is a continuation-in-part of application No. 08/559,989, filed on Nov. 17, 1995, now Pat. No. 5,672,399.

(51) Int. Cl.[7] .............................................. B01D 24/00
(52) U.S. Cl. ...................... 428/181; 428/212; 428/220; 428/903; 442/346; 442/351; 442/412; 442/389; 55/527
(58) Field of Search ................................. 428/181, 212, 428/220, 903; 442/346, 351, 412, 389; 55/527

(56) References Cited

U.S. PATENT DOCUMENTS 2,450,363 A    9/1948  Slayer et al.
3,073,735 A    1/1963  Till et al.
3,231,639 A    1/1966  Mabru
3,388,202 A    6/1968  Opferkach, Jr. et al.
3,837,995 A    9/1974  Floden (List continued on next page.)

FOREIGN PATENT DOCUMENTS

EP    1 469 740    4/1977
EP    0 670 385    8/1995

OTHER PUBLICATIONS

Brown, R.C., "Air Filtration: An Integrated Approach to the Theory and Applications of Fibrous Filters", Pergamon Press, pp. 120–137 (1993).

"Standard Test Method for Determining the Initial Efficiency of a Flatsheet Filter Medium in an Airflow Using Latex Spheres", pp 1–9, published on an unknown date by American Society for Testing and Materials, 1916 Race St., Philadelphia, PA 19103.

Product Brochure, "Torit Downflo Dust Collector", 6 pages, Published on an unknown date in 1994 by Donaldson Company, Inc., Industrial Group, P.O. Box 1299, Minneapolis, MN 55440.

Schwarz, "New Concepts in Process Design for Micro–Fibers by Melt–Blowing", TAPPI Seminar Notes, Nonwovens, pp. 17–25 (undated).

Jaroszczyk, T., "Experimental Study of Nonwoven Filter Performance Using Second Order Orthogonal Design", *Particulate Science and Technology*, 5: 271–287 (1987).

*Primary Examiner*—Elizabeth M. Cole
(74) *Attorney, Agent, or Firm*—Merchant & Gould, PC

(57) ABSTRACT

A preferred filter media is provided. The media includes a fine fiber web secured to the surface of a coarse fiber support. A preferred filter media, comprising multiple layers of fine fiber media separated by coarse fiber support, is provided. Advantageous filter constructions result and are provided. Also according to the disclosure, methods for using such arrangements to filter are provided.

17 Claims, 16 Drawing Sheets

U.S. PATENT DOCUMENTS

| | | |
|---|---|---|
| 4,011,067 A | 3/1977 | Carey, Jr. |
| 4,025,598 A | 5/1977 | Sasshofer et al. |
| 4,041,203 A | 8/1977 | Brock et al. |
| 4,073,850 A | 2/1978 | Brackmann et al. |
| 4,196,245 A | 4/1980 | Kitson et al. |
| 4,324,574 A | 4/1982 | Fagan |
| 4,370,289 A | 1/1983 | Sorenson |
| 4,375,718 A | 3/1983 | Wadsworth et al. |
| 4,436,780 A | 3/1984 | Hotchkiss et al. |
| 4,540,625 A | 9/1985 | Sherwood |
| 4,629,483 A | 12/1986 | Stanton |
| 4,650,506 A | 3/1987 | Barris et al. |
| 4,714,647 A | 12/1987 | Shipp, Jr. et al. |
| 4,728,349 A | 3/1988 | Oshitari |
| 4,765,812 A | 8/1988 | Homonoff et al. |
| 4,917,714 A | 4/1990 | Kinsley, Jr. |
| 5,108,474 A | 4/1992 | Riedy et al. |
| 5,238,474 A | 8/1993 | Kahlbaugh et al. |
| 5,283,106 A | 2/1994 | Seiler et al. |
| 5,350,443 A | 9/1994 | von Blucher et al. |
| 5,401,446 A | 3/1995 | Tsai et al. |
| 5,427,597 A | 6/1995 | Osendorf |
| 5,591,335 A | 1/1997 | Barboza et al. |
| 5,672,399 A * | 9/1997 | Kahlbaugh et al. ........ 428/36.1 |
| 6,165,572 A | 12/2000 | Kahlbaugh et al. |
| 6,171,684 B1 * | 1/2001 | Kahlbaugh et al. ......... 428/212 |

\* cited by examiner

FILTER MATERIAL CONSTRUCTION AND METHOD

CROSS-REFERENCE TO RELATED APPLICATIONS.

This application is a continuation of application Ser. No. 08/935,103, filed Sep. 29, 1997, issued as U.S. Pat. No. 6,171,684; application Ser. No. 08/935,103 is a continuation-in-part of application Ser. No. 08/859,221, filed May. 20, 1997, issued as U.S. Pat. No. 6,165,572; application Ser. No. 08/859,221 is a continuation of application Ser. No. 08/559,989, filed Nov. 17, 1995, issued as U.S. Pat. No. 5,672,399. Each of application Ser. Nos. 08/935,103; 08/859,221; and 08/559,989 is incorporated herein by reference.

FIELD OF THE INVENTION

The present invention relates to filters, filter constructions, materials for use in filter constructions and methods of filtering. Applications of the invention particularly concern filtering of particles from fluid streams, for example from air streams. The techniques described herein particularly concern the utilization of arrangements having one or more layers of fine fibers in the filter media, to advantage.

BACKGROUND OF THE INVENTION

Fluid streams such as air and gas streams often carry particulate material therein. In many instances, it is desirable to remove some or all of the particulate material from the fluid stream. For example, air intake streams to the cabins of motorized vehicles, to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because it can cause substantial damage to the internal workings to the various-mechanisms involved.

In other instances, production gases or off gases from industrial processes or engines may contain particulate material therein. Before such gases can be, or should be, discharged through various downstream equipment and/or to the atmosphere, it may be desirable to obtain a substantial removal of particulate material from those streams.

A variety of fluid filter arrangements have been developed for particulate removal. For reasons that will be apparent from the following descriptions, improvements have been desired for arrangements developed to serve this purpose.

A general understanding of some of the basic principles and problems of air filter design can be understood by consideration of the following types of media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

In general, for any given application, filter design has typically concerned a trade off of features designed for high filter efficiency and features designed to achieve high capacity (i.e. long filter lifetime). The "lifetime" of a filter is typically defined according to a selected limiting pressure drop across the filter. That is, for any given application, the filter will typically be considered to have reached its lifetime of reasonable use, when the pressure buildup across the filter has reached some defined level for that application or design. Since this buildup of pressure is a result of load, for systems of equal efficiency a longer life is typically directly associated with higher capacity.

Efficiency is the propensity of the media to trap, rather than pass, particulates. It should be apparent that typically the more efficient a filter media is at removing particulates from a gas flow stream, in general the more rapidly the filter media will approach the "lifetime" pressure differential (assuming other variables to be held constant).

Paper filter elements are widely used forms of surface loading media. In general, paper elements comprise dense mats of cellulose fibers oriented across a gas stream carrying particulate material. The paper is generally constructed to be permeable to the gas flow, and to also have a sufficiently fine pore size and appropriate porosity to inhibit the passage of particles greater than a selected size therethrough. As the gases (fluids) pass through the filter paper, the upstream side of the filter paper operates through diffusion and interception to capture and retain selected sized particles from the gas (fluid) stream. The particles are collected as a dust cake on the upstream side of the filter paper. In time, the dust cake also begins to operate as a filter, increasing efficiency. This is sometimes referred to as "seasoning," i.e., development of an efficiency greater than initial efficiency.

A simple filter design such as that described above is subject to at least two types of problems. First, a relatively simple flaw, i.e. rupture of the paper, results in failure of the system. Secondly, when particulate material rapidly builds up on the upstream side of the filter, as a thin dust cake or layer, it eventually substantially blinds off or occludes portions of the filter to the passage of fluid therethrough. Thus, while such filters are relatively efficient, they are not generally associated with long lifetimes of use, especially if utilized in an arrangement involving the passage of large amounts of fluid therethrough, with substantial amounts of particulate material at or above a "selected size" therein; "selected size" in this context meaning the size at or above which a particle is effectively stopped by, or collected within, the filter.

Various methods have been applied to increase the "lifetime" of surface-loaded filter systems, such as paper filters. One method is to provide the media in a pleated construction, so that the surface area of media encountered by the gas flow stream is increased relative to a flat, non-pleated construction. While this increases filter lifetime, it is still substantially limited. For this reason, surface-loaded media has primarily found use in applications wherein relatively low velocities through the filter media are involved, generally not higher than about 20–30 feet per minute and typically on the order of about 10 feet per minute or less. The term "velocity" in this context is the average velocity through the media (i.e., flow volume÷media area).

In general, as air flow velocity is increased through a pleated paper media, filter life is decreased by a factor proportional to the square of the velocity. Thus, when a pleated paper, surface loaded, filter system is used as a particulate filter for a system that requires substantial flows of air, a relatively large surface area for the filter media is needed. For example, a typical cylindrical pleated paper filter element of an over-the-highway diesel truck will be about 9–15 inches in diameter and about 12–24 inches long, with pleats about 1–2 inches deep. Thus, the filtering surface area of media (one side) is typically 37 to 275 square feet.

In many applications, especially those involving relatively high flow rates, an alternative type of filter media, sometimes generally referred to as "depth" media, is used. A typical depth media comprises a relatively thick tangle of fibrous material. Depth media is generally defined in terms of its porosity, density or percent solids content. For example, a 2–3% solidity media would be a depth media mat of fibers arranged such that approximately 2–3% of the overall volume comprises fibrous materials (solids), the remainder being air or gas space.

Another useful parameter for defining depth media is fiber diameter. If percent solidity is held constant, but fiber diameter (size) is reduced, pore size is reduced; i.e. the filter becomes more efficient and will more effectively trap smaller particles.

A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter media is positioned.

Gradient density depth media arrangements have been developed. Some such arrangements are described, for example, in U.S. Pat. Nos. 4,082,476; 5,238,474; and 5,364,456. In general, a depth media arrangement can be designed to provide "loading" of particulate materials substantially throughout its volume or depth. Thus, such arrangements can be designed to load with a higher amount of particulate material, relative to surface-loaded systems, when full filter lifetime is reached. However, in general the tradeoff for such arrangements has been efficiency, since, for substantial loading, a relatively low solids media is desired. Gradient density systems such as those in the patents referred to above, have been designed to provide for substantial efficiency and longer life. In some instances, surface-loading media is utilized as a "polish" filter in such arrangements.

SUMMARY OF THE INVENTION

According to certain aspects of the present invention, a filter media construction is provided. The filter media construction can be used as a filter media in preferred filter arrangements. It may, in some instances, be utilized as one layer of media in a multi-layer arrangement, for example. In some arrangements, layers of filter media according to the present invention can be stacked, to create a preferred construction. Herein various layers or volumes of media will sometimes be referred to as "regions".

A preferred filter media construction according to the present invention includes a first layer of permeable coarse fibrous media having a first surface. A first layer of fine fiber media is secured to the first surface of the first layer of permeable coarse fibrous media. Preferably the first layer of permeable coarse fibrous material comprises fibers having an average diameter of at least 10 microns, typically and preferably about 12 (or 14) to 30 microns. Also preferably the first layer of permeable coarse fibrous material has a basis weight of no greater than about 50 grams/meter$^2$, preferably about 0.50 to 25 g/m$^2$, and most preferably at least 8 g/m$^2$. Preferably the first layer of permeable coarse fibrous media is at least 0.0005 inch (12 microns) thick, and typically and preferably is about 0.001 to 0.010 inch (25–254 microns) thick.

In preferred arrangements, the first layer of permeable coarse fibrous material comprises a material which, if evaluated separately from a remainder of the construction by the Frazier permeability test, would exhibit a permeability of at least 150 meters/min, and typically and preferably about 200–450 meters/min. Also preferably, it is a material which, if evaluated on its own, has an efficiency of no greater than 10% and preferably no greater than 5%. Typically, it will be a material having an efficiency of about 1% to 4%. Herein when reference is made to efficiency, unless otherwise specified, reference is meant to efficiency when measured according to ASTM #1215–89, with 0.78 $\mu$ monodisperse polystyrene spherical particles, at 20 fpm (6.1 meters/min) as described herein. Herein this will sometimes be referred to as the "LEFS efficiency".

Herein, when a layer of material utilized in arrangements according to the present invention is characterized with respect to properties it "has" or would exhibit "on its own" or when tested "separately from the remainder of the construction", it is meant that the layer of material is being characterized with respect to the source from which it is derived. That is, for example, if reference is made to the "coarse" layer of material, in a composite, the description when characterized as referenced above, is with respect to the material and its properties as it would have existed before being incorporated into the construction. Reference in this context is not necessarily being made to the specific numerical characteristics of, or performance of, the layer as it operates in the composite structure.

Preferably the layer of fine fiber material secured to the first surface of the layer of permeable coarse fibrous media, is a layer of fine fiber media wherein the fibers have average fiber diameters of no greater than about 10 microns, generally and preferably no greater than about 8 microns, and typically and preferably have fiber diameters smaller than 5 microns and within the range of about 0.1 to 3.0 microns. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1–8 times (and more preferably no more than 5 times) the fine fiber average diameter of the layer.

Preferably, when the application is for air filter applications such as engine induction systems, gas turbines, cabin air filtration, and HVAC (heat, ventilation and air conditioning) systems, the preferred upper basis weights for the fine fiber layers are as follows: for a layer of glass fiber material average size 5.1 micron, about 35.8 g/m ; for glass materials average fiber size 0.4 micron, about 0.76 g/m$^2$; and, for glass fibers average size 0.15 micron, about 0.14 g/m$^2$; for polymeric fine fibers average size 5.1 micron, about 17.9 g/m$^2$; for polymeric fibers average size 0.4 micron, about 0.3 g/m$^2$; and, for polymeric fine fibers 0.15 micron average size, about 0.07 g/m$^2$. In general, preferably the most upstream layer of fine fibers has a basis weight of no greater than about 1 g/m$^2$, for such applications.

When the material is utilized for high efficiency applications, such as selected indoor air applications and liquid applications (such as lube oil, hydraulic fluid, fuel filter systems or mist collectors), in general the preferred upper limits of the basis weights for the fine fiber layers will be as follows: for glass fibers average size 2.0 micron, about 15.9 g/m$^2$; for glass fibers average size 0.4 micron, about 1.55 g/m$^2$; and, for glass fibers average size 0.15 micron, 0.14 g/m$^2$; for polymeric fine fibers average size 2.0 micron, about 8.0 g/m$^2$; for polymeric fibers average size 0.4 microns, about 0.78 g/m$^2$; and, for polymeric fibers average size 0.15 microns, about 0.19 g/m². In general, preferably the most upstream layer of fine fibers has a basis weight of no greater than about 1 g/m², for such applications.

The upper limits given for the air filtration applications, such as air induction systems etc., were based upon fine fiber layer thicknesses of about 5 fiber diameters, and an LEFS efficiency of 50% for the layer. For the high efficiency applications, the assumption was based upon five fine fiber thicknesses and an LEFS efficiency of about 90% per layer.

In general, the preferred basis weight for any given situation would depend upon such variables as: the application involved (for example coarse or fine particles, or both, to be trapped in operation, high efficiency or lower efficiency needs); the desired life; the fiber material selected; and, the fiber size used. In general, when relatively high single-layer efficiency is desired (for example on the order of 90% LEFS), generally the glass fibers will work well, and the system will involve higher basis weights (for example about 20 g/m²), at higher fiber diameters (for example 2–3 microns).

On the other hand, when relatively low single-layer efficiencies are desired, but relatively high lifetime until loaded (resulting from the use of a number of layers) relatively low efficiencies for any given layer will be used (for example on the order of 10% LEFS). This will involve relatively low basis weights and fairly small diameter fiber. Polymer fibers may be usable for this (although glass ones could also), and thus basis weights on the order of 0.005 g/m², with a fiber size of about 0.2 microns will be usable. Herein, when the basis weights are given, for glass fibers the assumption is a density of 2.6 g/cc, and for polymer fibers the assumption is a density of 1.3 g/cc.

In general, then, if what is desired by the engineer is to provide longer life, generally more layers, each layer having relatively low efficiency, will be used. If the engineer desires a very high efficiency filter, and long life is not necessarily desired, in general fewer layers with higher LEFS efficiency per layer will be used.

Herein the term "first" or "second" in reference to a construction, for example surfaces of media, is not meant to refer to any particular location in the media. For example, the term "first surface" on its own is not intended to be indicative of whether the surface referred to is upstream or downstream of other surfaces, or positioned above or below other surfaces. Rather, the term is utilized to provide for clarity in reference and antecedent basis. The term "1–8 fine fiber average diameters" is meant to reference a depth or thickness of about 1 times to 8 times the average diameters of the fine fibers in the fine fiber layer referenced.

In typical preferred systems, the fine fibers of the first layer of fine fiber media comprise fibers with diameters of no greater than about ⅙th, preferably no greater than about ⅒th and in some instances preferably no greater than about 1/20th of the diameters of the fibers in the first layer of permeable coarse fibrous media.

For certain applications, preferably the first layer (most upstream in operation) of fine fiber material is constructed and arranged to provide the resulting composite (i.e. the combination of the first layer of permeable coarse media and the first layer of fine fiber media) with an overall LEFS efficiency of at least 8%, preferably at least 10%, typically within the range of 20 to 60%, and most preferably at least 30% and no greater than about 70%. Such composites can then be stacked to create very efficient, for example greater than 97%, and if desired up to 99% or more, filters. They may also be used for less efficiency but very long life filters, at least 10% typically, for example 50–97% efficient. Also, preferably, the first (most upstream in operation) layer of fine fiber media is constructed and arranged such that the resulting composite (i.e. the combination of the first layer of permeable fibrous media with the first layer of fine fiber media thereon) has an overall permeability of at least 20 meters/min, and typically and preferably about 30 to 350 meters/min. Herein the term "most upstream" or "outermost" in connection with a fine fiber layer refers to the layer of fine fiber material (average fiber diameter less than 8 microns) in the position to be most upstream, relative to other fine fiber layers, in use. There may be more upstream layers of media (not fine fiber) than the most upstream fine fiber layer.

The first layer of permeable coarse fibrous material may be fibers selected from a variety of materials, including for example polymeric fibers such as polypropylene, polyethylene, polyester, polyamide, or vinyl chloride fibers, and glass fibers.

According to certain aspects of the present invention, a filter construction is provided which includes more than one layer, and preferably at least 3 layers, of fine fiber material. Typically the arrangements will include three or more such layers. It is not a requirement that the fine fiber layers in such a multi-layered system be identical to one another. However, preferably each fine fiber layer is a layer within the general description provided above for the first layer of fine fiber media in the media construction as described. Preferably in such arrangements each layer of fine fiber material is separated from its next adjacent layer of fine fiber material, by a layer of permeable coarse fibrous material which operates as a spacing layer or spacing matrix.

The layers of permeable coarse fibrous material need not be identical, but preferably each is within the general description given with respect to the filter media construction, for the first layer of permeable coarse fibrous media. In certain preferred arrangements, the overall composite media construction also has a layer of permeable coarse fibrous media, as described, on both the most upstream and most downstream surfaces.

The filter construction may comprise a pleated arrangement of the composite, if desired. For example, such an arrangement can have pleats that are 0.25 to 12 inches (0.6–30.5 cm) deep, with a pleat density of at least 1–15 pleats/inch (1–15 pleats/2.5 cm). When it is said that the pleat density is at least 1–15/inch, and the arrangement is configured in a cylindrical pattern, with the pleats extending longitudinally, reference is made to pleat spacing around the inner diameter or surface.

Certain preferred arrangements according to the present invention include media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes. The constructions may be utilized in association with inner wraps or outer wraps of depth media, for example in accordance with the arrangements described in U.S. patent application Ser. No. 08/426,220, incorporated herein by reference.

It is foreseen that in some applications, media according to the present invention may be used in conjunction with other types of media, for example conventional media, to improve overall filtering performance or lifetime. For example, media according to the present invention may be laminated, or otherwise applied, to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter. The many variations possible will be apparent, from the more detailed descriptions below.

Certain arrangements according to the present invention may also be utilized in liquid filter systems, i.e. wherein the particulate material to be filtered is carried in a liquid. Also, certain arrangements according to the present invention may be used in mist collectors, for example arrangements for filtering fine mists from air.

According to the present invention, methods are provided for filtering. The methods generally involve utilization of media as described to advantage, for filtering. As will be seen from the descriptions and examples below, media according to the present invention can be specifically configured and constructed to provide relatively long life in relatively efficient systems, to advantage.

As will be apparent from the above discussions, and the detailed description below, certain specifically preferred arrangements, especially preferred for air filter constructions, are provided. A form of these is characterized as filter media constructions. The preferred filter media constructions comprise a plurality of layers of fine fiber media, i.e. at least two layers, each of the layers of fine fiber media comprising fibers having diameters of no greater than about 8 microns. The plurality of layers of fine fiber media include an outermost layer. Again, by "outermost" in this context, it is meant that there is a layer of fine fibers in the media which, when the media is organized or oriented for use as a filter media, would be positioned more upstream than any other layer of fine fiber material. This does not mean that the first "outermost" layer of fine fiber material is the outermost layer of media in the construction. Rather, it is the "outermost" or end layer among the plurality of fine fiber layers. When this filter media construction is in use, then, this fine fiber layer will be the upstream fine fiber layer of media in the construction. Preferably this outermost layer of fiber fibers includes fibers having an average diameter of no greater than about 5 microns, and a thickness of no greater than about 5 times the fine fiber average diameters in that outermost layer. Thus, it would have a thickness of no greater than about 25 microns maximum, and in typical applications wherein smaller diameters than 5 microns are used, a substantially smaller thickness. Preferably this outermost layer of fine fibers is relatively permeable having, on its own, a permeability for air of at least 90 meter/min. Of course, if the permeability of this fine fiber layer is measured in association with a coarse supporting substrate, if the overall combination has a permeability of at least 90 meter/min, the fine fiber layer itself does.

Preferably in this construction there is a layer of permeable coarse fibrous media positioned between each pair of layers of fine fiber media. Preferably each layer of permeable coarse fibrous media comprises fibers of at least 10 microns in diameter and preferably each layer has an efficiency, if evaluated separately from the construction, of no greater than about 20%, and more preferably no greater than 10%, for 0.78 $\mu$ particles as defined.

Preferably this media construction includes at least three layers of fine fiber material, although the at least two layers downstream from the "outermost" layer need not necessarily have an average diameter smaller than 5 microns, but rather it would be preferred that they are at least smaller than 8 microns; and, they may be less permeable than the outermost layer of fine fiber material, preferably each having a permeability on its own of at least 45 meter/min.

Additionally, a preferred filter media construction according to the present invention may be defined as having a first layer of permeable coarse fibrous media comprising coarse fibers having an average diameter of at least 10 microns, an efficiency of no greater than about 5%, for 0.78 $\mu$ particles, and a first surface on which is positioned a first layer of fine fiber media. Preferably the first layer of fine fiber material comprises fibers having an average diameter of no greater than about 5 microns, and a thickness of no greater than about 5 times the average diameter of the fine fibers in this first layer. Preferably this material has a permeability, on its own of at least about 90 meter/min. This media construction, of course, can be utilized in association with other layers of fine fiber and coarse fiber material, and may even be utilized in overall media constructions that use other types of media, for example in association with paper or glass media or other types of depth media. The media construction of this embodiment may also include a plurality of further layers of fine fiber material, each of which is spaced from the next adjacent one by a layer of coarse fiber media.

In some instances, treatments may be added to the fibers to enhance such characteristics as efficiency, filter life or both.

An overall filter construction may be provided, using media according to the present invention; and as defined in either of the above two identified preferred embodiments.

BRIEF DESCRIPTION OF THE DRAWINGS

FIG. 3 being of a different media than that shown in FIG. 1.

FIG. 15 being taken of an opposite side of the media from that shown in FIG. 14.

FIG. 23A is another plot of data from Experiment 6.

DETAILED DESCRIPTION

A. Filtration Advantages of Fine Fibers

In general, in filter media constructions, some filtration advantages are theoretically provided by utilizing relatively fine fibers instead of coarse fibers, for the media. Consider for example FIGS. 1 and 2. FIG. 2 is a schematic illustrating a "single" or "mono-" layer of fine fiber media, with a fixed interfiber distance, $D_x$, representing the distance between the surfaces of adjacent fibers. FIG. 2 is a schematic representation depicting a single layer with the same $D_x$ but wherein the fiber diameter is about 12 times larger than the fiber diameter in FIG. 1.

Figure 1:
FIG. 1 is a schematic representation of a cross section of a theoretical mono-layer fine fiber filter media.
Figure 2:
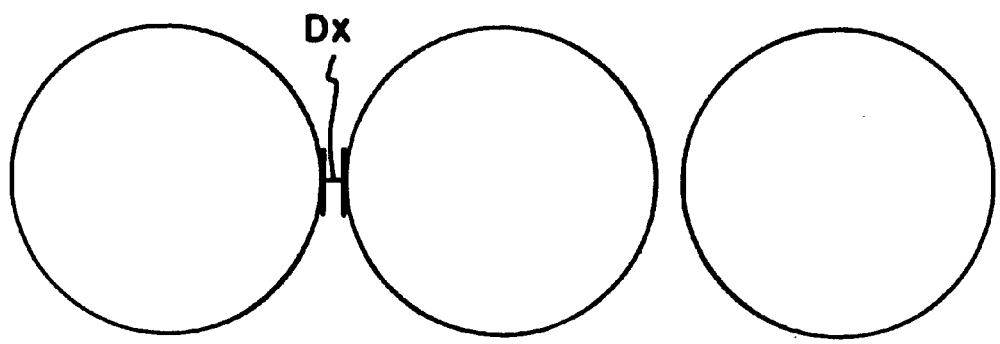
FIG. 2 is a schematic representation of a cross section of a theoretical mono-layer coarse fiber filter media.

Comparing FIGS. 1 and 2, it is apparent that, for an area of fixed media perimeter (i.e. area) the total amount of air space or void space between the fibers in the arrangement of FIG. 2 is substantially smaller than the void space in the arrangement of FIG. 1. Thus, in the arrangement of FIG. 2, there is significantly less volume available for loading of particulate material trapped by the system. In addition, air flow is more disrupted by the arrangement of FIG. 2, than it is in the arrangement of FIG. 1, since a smaller percent of the surface is open for undisrupted air flow therethrough.

From a comparison of FIGS. 1 and 2 it is apparent that if average interfiber distance ($D_x$) is maintained constant, but average fiber size is reduced, typically a greater space available for loading results and higher permeability to air flow results.

Figure 3:
FIG. 3 is a schematic representation of a cross section of a theoretical mono-layer fine fiber filter media.
Figure 4:
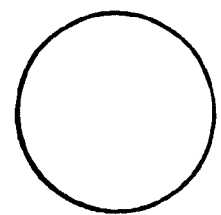
FIG. 4 is a schematic representation of a cross section of a theoretical mono-layer coarse fiber media arrangement having the same percent solidity as the arrangement shown in FIG. 3.
Figure 4:
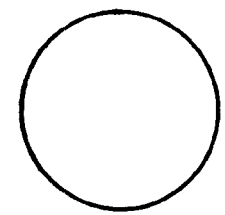
Figure 4:
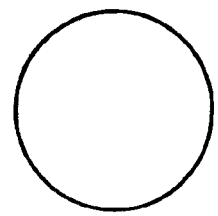

Now consider the arrangements of FIGS. 3 and 4. FIGS. 3 and 4 are intended to schematically represent a single layer of fibers in two depth media systems in which fibers of different sizes are used, but percent solidity or density is held constant. From a review of the figures, it should be apparent that the arrangement with the larger fibers, i.e. the arrangement of FIG. 4, has potentially such large open areas that the filter efficiency is relatively low (but permeability is very high), by comparison to an arrangement with smaller diameter fibers but the same percent solidity, i.e. the arrangement of FIG. 3.

Theoretical considerations of the effects of utilizing smaller fiber diameters have been studied and have been represented quantitatively by the Stokes Number and Interception Parameter.

The dimensionless Stokes Number is represented by the following formula:

STOKES NUMBER=$d_p^2 \rho_p v / 9\, d_f \mu$ wherein: $d_f$=fiber size (diameter), $d_p$=particle size (diameter), $\rho_p$=particle density; v=approach velocity and $\mu$=fluid viscosity.

From the formula it will be apparent that (at least theoretically) as $d_f$ (fiber size) is decreased, Stokes Number is increased (assuming no change in the other variables).

In general, the Stokes Number is reflective of inertial impaction. This can be understood by considering the likelihood that as an airstream is distorted or curved around a fiber, a particle within the airstream and directed toward the fiber will leave the airflow (rather than curve with the air flow) and impact the fiber. The variables reflected in the formula above for the Stokes Number logically reflect that, in general, an increase in momentum of the particle (from increasing density and/or velocity) is associated with a greater likelihood that the particle will not flow around the fiber with the airflow stream, but rather that it will leave the airflow stream and directly impact the fiber. The formula also indicates that this likelihood is greater when the fiber diameter is smaller, due, at least in part, to the fact that when the fiber diameter is smaller, the fiber will disrupt the airflow stream to a lesser extent. This brings the effected flow field of the airstream, as it curves around the fiber, into closer proximity to the surface of the fiber and increases the likelihood that a lower momentum particle will still leave the air stream sufficiently to encounter (impact) the fiber.

Another consideration relating to why certain fine fiber systems are theoretically generally more efficient as filters than coarse fiber systems, is particle interception, reflected by the Interception Parameter. Interception Parameter (R) can be represented by the following formula:

$R = d_p / d_f$ wherein $d_p$ and $d_f$ are defined as above.

In general, Interception Parameter is velocity and momentum independent, and relates to the size of the particle and the size of the fiber. In general, it relates to the likelihood that a particle (which tends to curve with the airstream, as the airstream is distorted around the surface of the fiber), will nevertheless encounter the fiber and become trapped. Thus, it does not directly relate to the likelihood that the momentum of the particle will carry it out of the airstream and into the fiber, but rather whether, while within the airflow stream, the particle will nevertheless encounter the fiber. In general, since smaller fibers disrupt the airflow to a lesser extent, and the distortion in the air flow (from linear) occurs closer to the surface of the fiber, smaller fibers are associated with higher efficiencies and a higher rate of interception impactions than larger fibers.

In general, the advantages associated with the use of fine fibers in a media are more pronounced with relatively small particles. Thus the advantages of fine fibers may be of particular interest when the filter application will require filtering of small particles, especially those 10 microns or less in size (diameter).

B. Some Problems and Limits Associated with Utilization of Relatively Fine Fibers in Filter Media In the previous section, theoretical advantages available from selection of small diameter fibers in a filter media, relative to coarser fibers, were provided. Problems would result, however, if coarse fibers, i.e. on the order of about 10 or 12 microns (diameter) on up, were simply replaced in depth media by very fine fibers, i.e. on the order of about 8 microns and below, typically 5 microns and below, especially on the order of about 0.2–3.0 microns. For example, constructions made from fibers on the order of about 0.2–5 microns in size would be more difficult to handle (than constructions of coarser fibers) and would tend to collapse in use, creating a very low permeability. That is, it is relatively difficult to maintain a substantially open structure for high loading and high flow therethrough, with a construction merely comprising fibers of 5 microns or below in diameter, since such media typically possesses insufficient mechanical strength (or "body") to resist collapse. When the media collapses, the spaces between the fibers become relatively small, and the construction, while perhaps quite efficient as a filter, loads fairly rapidly and is not very permeable. Indeed, such a system will begin to approximate a surface-loading system in behavior, since a relatively low porosity and shallow depth is, in effect, what results.

One can conceive of a construction in which extremely fine fibers are intimately mixed with (i.e. are entangled with) coarse fibers. However, construction of effective filter arrangements, especially using conventional techniques for creating depth media of mixed fiber diameters, is not readily achieved when the diameters of the fibers are greatly different. For example, consider a theoretical system in which the fine fibers are ⅟₂₀th of the diameter of the coarse fibers. If the filter media, that the air being filtered passes through, comprises 50% by weight of the coarse fiber and 50% by weight of the fine fiber, the system is one in which there is a very high number of fine fibers relative to coarse fibers (or fine fiber length relative to coarse fiber length). This would be a system with a relatively low interfiber spacing or porosity. It might be relatively efficient, but it would still load fairly rapidly. In general, if the weight of the coarse fibers relative to the fine fibers is reduced, the problem is exacerbated. If the weight of the coarse fibers relative to the fine fibers is increased, the advantages associated with fine fibers and related to interception and inertial impaction would be compromised.

C. Some Conventional Uses of Fine Fibers in Media

There has been some conventional use of fine fibers in media. In particular, Donaldson Company Inc. of Bloomington Minn., the Assignee of the present invention, has utilized fine fiber technology in its Ultra-Web® products. These products have generally comprised surface loading cellulose media, which has a web or net of polymeric microfibers, of less than 1 micron in diameter, on an upstream surface.

Such media has typically found use in pulse cleaned dust collectors. In operation, and without the fine fibers, the coarse, surface loading, cellulose media operates in part as an internal trap for small particles. When this occurs, pulse cleaning is less effective since some particles are trapped inside the cellulose media. However, the fine web, when used, generally operates to collect particulates upstream of the surface loading cellulose fibers, facilitating particle release when the reverse pulse is applied.

Another use of fine fibers is described in U.S. Pat. No. 4,011,067, incorporated herein by reference. In this reference, fine fibers are applied to a porous base.

D. A General Approach to Effective Utilization of Fine Fiber Media for Filtration Purposes in a Filter Construction A general approach for the utilization of fine fibers, i.e. on the order of 8 or 10 microns or less in diameter, preferably 5 microns or less and typically about 0.1 to 3.0 microns in diameter (average), in filter media has been developed. In general, a very porous, permeable substrate of relatively coarse fibers is used as a support, support matrix or spacing layer for the very fine fiber media. The material can then be configured in a preferred manner, to achieve an efficient, relatively long life, filter.

In preferred systems, multiple layers of fine fiber media, separated as described, are used to advantage. When multiple layers of fine fiber media, separated as described, are used, long-life, highly efficient filtering systems can be readily obtained.

Figure 5:
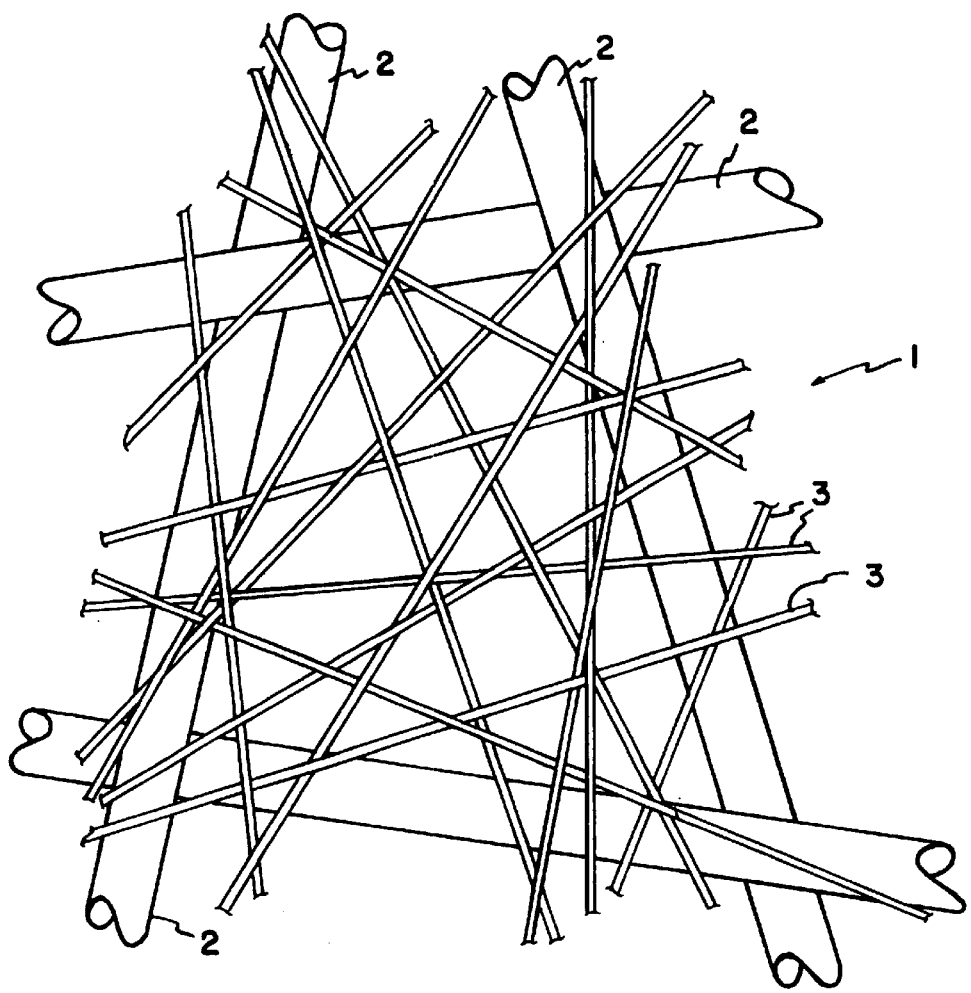
FIG. 5 is a schematic fragmentary plane view of a surface of a media construction according to the present invention.

In FIG. 5, a schematic representation of a filter material according to the present invention is provided. Referring to FIG. 5, the material 1 includes coarse fibers 2 and fine fibers 3. The material 1, however, is not a material in which the fibers of different sizes are mixed together or are intimately entangled, when the material is created. Rather, material 1 generally comprises a layer (having depth) of coarse fibers 2, at least one outer surface of which has had the fine fibers 3 applied thereto. That is, the media comprises a web of fine fibers on at least one outer surface of a structure of coarse fibers. The fine fibers in the web of fine fibers, then, are not mixed in or entangled with the coarse fiber matrix. Herein, the layer of coarse fibers 2 is sometimes referred to as a layer of permeable coarse fibrous media or material. It comprises a substrate on which the fine fibers 3 are positioned.

The arrangement of FIG. 5 can be visualized as somewhat analogous to a spider web strung between the rails of a fence. (The analogy is most appropriate if it is also assumed that the spider web is positioned and attached at one side or surface of the fence.) The rails, or coarse fibers 2, provide for a very porous open area, and do not substantially interfere with the airflow through the open space. The fine fibers 3 represent the web suspended in or across the open space. Since the majority of the airflow stream through such a material is not substantially disrupted by the coarse fibers 2, the involvement of the coarse fibers 2 in interception impaction and inertial impaction is relatively small. The extremely fine fibers 3, however, are strung across the volume where the substantial airflow will occur. Advantage is thus taken of the fine fiber size with respect to inertial impaction and interception impaction. In applications wherein more than one layer of fine fiber is used, the spiderweb analogy would involve a plurality of fences stacked against one another, each of which having a spiderweb on a side thereof. The effect would be the stacking of spaced-apart fine spiderwebs.

Figure 6:
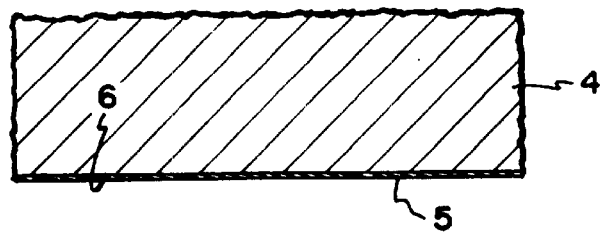
FIG. 6 is a schematic cross sectional view of a media according to FIG. 5.

In general, FIG. 6 is a fragmentary cross sectional view of material such as that illustrated in FIG. 5. FIG. 6 is schematic in nature. It will be understood that, in general, FIG. 5 is greatly enlarged relative to FIG. 6, so that detail can be understood.

In FIG. 6, the layer of depth media of coarse fibers is represented generally at 4 and the layer of very fine fibers is illustrated at 5. It will be understood that the fine fibers 5 are applied to surface 6 of the coarse fiber matrix 4.

In general, for preferred constructions the layer of fine fibers will be configured approximately as a mono-layer, and to not have a thickness much greater than about 1–8 fine fiber diameters. In general, its depth will be no greater than about 10–15 microns at any given location, and typically no greater than about 2–4 microns.

The depth of the coarse support media 4 will be varied from system to system. The schematic of FIG. 6 is simply presented to indicate that in general the depth of the coarse media 4 will be relatively great, by comparison of the depth of the layer of fine fibers 5.

The construction of FIGS. 5 and 6, however, would be expected to be a relatively inefficient filter, especially if a very open layer of fine fibers is used, since a substantially large void volume or interfiber spacing (i.e. spacing between the fine fibers) is provided. That is, air passing through the void volume and not near a fine fiber would not be filtered to a significant extent, when the fine fibers are sparsely distributed.

As indicated above, according to the present invention, in preferred filter constructions, material such as that reflected in the schematic of FIG. 5 is arranged in multiple layers, for example, in a stack. A stack of layers, each of which is similar to FIG. 5, would present the relatively fine fibers 3 in a substantially effective density, with respect to likelihood of being encountered by particles in an airflow stream passing through the entire system. The relatively large void volume provided by the very porous coarse fibers 2, would allow for a substantial loading volume, permeability and thus a relatively long lifetime. It can be theorized, therefore, that such a construction can be developed which would be both very efficient as a filter and of relatively long usable lifetime. As the experiments below indicate, in practice this is achieved.

Figure 21:
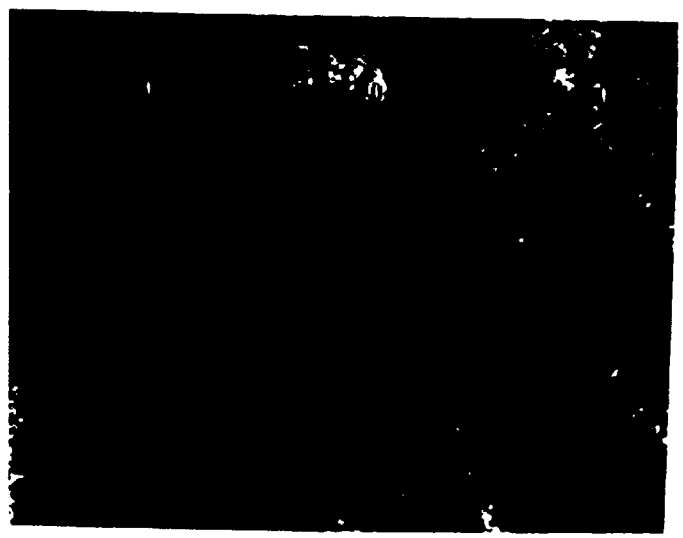
FIG. 21 is a scanning electron micrograph of the media of FIG. 19, after NaCl loading according to a description herein.

A further advantageous aspect of the arrangement shown in FIG. 5 can be understood by considering the effect of such a composite on trapping particles, in operation. In general, if the arrangement is examined after a period of particle loading, the particles will appear primarily trapped on, and secured to, the individual fine fibers, as small individual particles or agglomerations of particles. The fiber spacing between the fine fibers is sufficiently large that a substantial amount of bridging between the fibers does not occur. This is shown in FIG. 21, discussed below. Indeed the fiber spacing is sufficiently large so that as bridging begins to occur, the particle dendrites tend to break up and fall through the layer of fine fiber.

This is highly advantageous. In arrangements wherein the fiber spacing is relatively low, but efficiency is relatively high, a substantial amount of particle bridging among the fibers or across the spaces tends to occur. This can blind off a portion of the filter media involved, to the passage of air therethrough, and significantly reduce permeability of the filter. This leads to an increase in pressure differential across the filter and, eventually, to shorter filter lifetime. Large fiber spacing in a layer, however, reduces the likelihood of this.

As will be understood from further descriptions, the fact that a particle bridge, if it begins to form, would tend to break and fall through the layer or material does not pose a problem with respect to efficiency, since the typical use of material such as shown in FIG. 5 will be in arrangements that involve more than one layer of filter media.

In this section, certain arrangements according to the present invention involving a stack of media were presented. As will be expressed in detail in other sections below, a stack can be constructed by alternately applying coarse and fine fibers to a structure, rather than by combining pre-formed composites (or layers) of the type shown in FIG. 5. In the end, the effects on filtering should generally be the same, however one or the other type of process, or alternatives, may be preferred for reasons not related to the performance of the final structure.

E. Typical Constructions

From the above it will be apparent that many typical filter media constructions according to the present invention, when configured for use to filter, will include multiple layers of media, with at least two layers effectively comprising a coarse framework supporting or spacing fine fibers or fine fiber webs. An example of such an arrangement, sometimes referred to herein as a stack, is shown schematically in FIG. 7.

In general, stacked arrangements may be constructed from multiple layers of the same media composite. Alternatively, a gradient can be provided in the stacked arrangement, for example, by using somewhat different composite materials in each layer or applying layers appropriately while making the multi-layer composite. The materials in the various layers, for example, may be varied with respect to the average population density of the fine fibers across the open spaces of the coarse support. Alternatively, or in addition, the diameters of the fine fibers can be varied from layer to layer. Of course, arrangements can include one or more layers of one particular construction, and also one or more layers of a different construction or more than one different construction.

Figure 7:
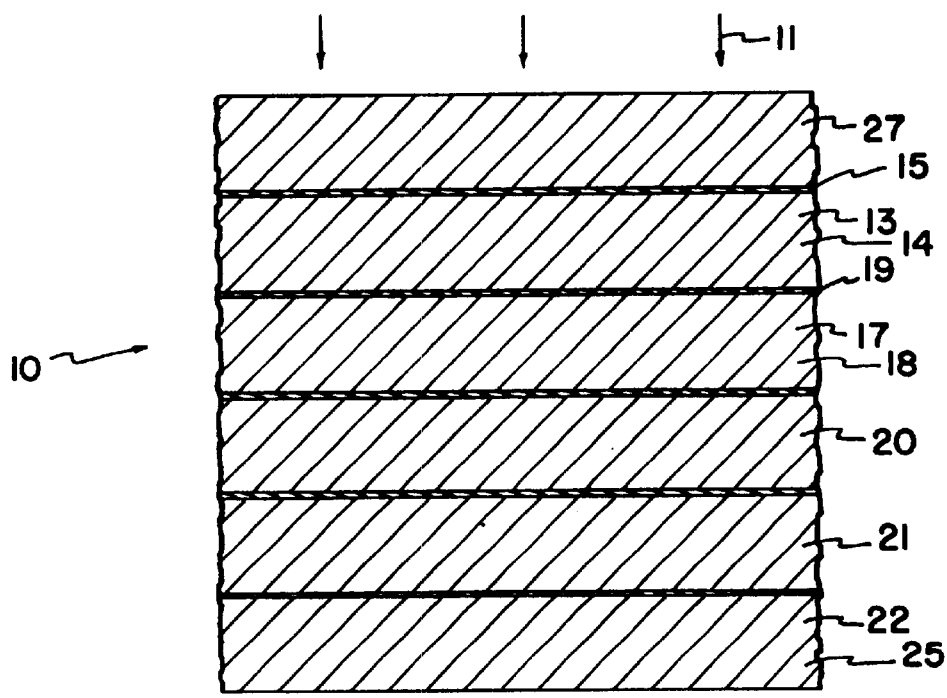
FIG. 7 is a schematic fragmentary cross sectional view of a multi-layer media construction according to the present invention.

Referring to FIG. 7, in general a media construction 10 comprising a stack of various layers of filter media is shown. For the arrangement shown in FIG. 7, consider an air flow in the direction indicated generally by arrows 11. Construction 10 includes a layer or region 13 of media comprising a coarse support 14 having a thin layer 15 of fine fibers on a surface thereof. In the particular arrangement shown, layer 15 is on an upstream surface of support 14. Downstream from layer 13 is a similar layer 17 comprising a coarse support 18 and an upstream, thin, fine fiber layer 19. Arrangement 10 includes further layers 20, 21 and 22 analogously constructed to layers 13 and 17. Thus, for the arrangement shown in FIG. 7, coarse region 25 of layer 22 is positioned most downstream.

For the particular arrangement depicted, upstream of the most upstream fine fiber layer 15, is located a layer 27 of coarse fiber, protective, scrim or media.

In general it will be understood that for certain embodiments, the overall construction 10 of FIG. 7 will only be about 0.020 to 0.060 inch (0.05–0.15 cm) thick, and in some instances even thinner. Thus, it is enlarged and exaggerated greatly in the figure. It comprises a stack of layers of fine fibers, each of which is spaced from the next adjacent fine fiber layer by a coarse separating or support layer or matrix. On each side, i.e. the most upstream side 27 and most downstream side 25, is located a protective layer of coarse scrim or media. The particular arrangement of FIG. 7 is shown with five, discrete, fine fiber layers, but alternate amounts or numbers of layers can be used. Again, there is no requirement that the fine fiber layers be identical to one another, or that the various coarse support layers be identical to one another. By "discrete" in this context it is meant that each fine fiber layer is not substantially entangled with the separating coarse support fibers, but rather each fine fiber layer generally sits on a surface of a support structure.

1. The Coarse Support/Spacing Structure

A principal function of the coarse material in filter media layers according to the present invention is to provide for a framework across which the fine fibers are extended. Another principal function of the coarse material is to provide for spacing between the regions or layers of fine fibers, in the stack, so that the separated layers of fine fibers do not collapse into a relatively dense (.i.e. low permeability and relatively low loading) construction. The coarse support/spacing structure is not typically provided to serve any substantial filtering function. Indeed, it preferably is a material so open and permeable that it does not serve any substantial filtering function.

In general, for typical applications such as those described herein, it will be preferred that the overall composite (i.e. the resulting multi-layered, filter media) be a relatively flexible arrangement, which can be arranged in a variety of geometric configurations. In some arrangements it will be preferred that the coarse support comprise a flexible fiber construction that has sufficient mechanical integrity or "body" to allow for this. However in some arrangements this "body" can be provided by a component other than the same coarse fiber material used to space the fine fiber layers, or it can be provided by the overall composite. This will be described below.

Some of the more important parameters which relate to the selection of the flexible fiber construction for the coarse support, may be summarized by the following:

a. It is preferred to select a material which has a very low percentage solidity and a very high permeability, if possible, to enhance the "void space" across which the fine fiber web will extend. A material which has a filtering efficiency of only about 10% or less, typically 5% or less and preferably only 1–4%, for trapping 0.78 micron particles according to the test described herein, sometimes referred to as LEFS efficiency, will be preferred. Preferably it is a material having a single layer permeability when evaluated by the Frazier Perm Test, of at least 150 meters/min, typically at least about 200–450 meters/min.

b. The coarse support/spacing material should be sufficiently thick to keep the layers of fine fibers separated. In general, for some systems the layer of coarse material need not be any thicker than is minimally necessary to achieve this spacing. It is foreseen that a thickness on the order of about 0.001 inch (25 microns) or so will be more than sufficient. While the material or process selected for the coarse substrate may be thicker than about 0.001 inch, for example on the order of about 0.010 inch (254 microns), the additional thickness is not necessarily associated with any advantage in connection with actual performance of the stacked arrangement as an efficient filter. That is, especially in stacked arrangements, thicknesses on the order of 0.001 inch (25 microns) will be sufficient to support the fine fibers and can provide for an open volume for loading of particulates. In many systems, greater thicknesses will not really enhance this operation to any significant extent. Thus, in certain preferred arrangements each layer of coarse fiber material, which separates layers of fine fibers, is no greater than about 0.030 inches (760 microns) thick. Alternately stated, the fine fiber layers are preferably no greater than about 0.03 inches (760) microns apart. Greater thicknesses, however, are permissible and can provide for a wider selection of available materials to be used as the coarse layer. In addition, thicker layers of scrim or coarse fibers may provide for improvement in "body" or mechanical strength. On the other hand, relatively thick layers may take up an undue or undesirable amount of space in some filter constructions.

c. While the particular material from which the fibers of the coarse support are constructed is not critical, in general it will be preferred to select material that is sufficiently strong and tough to withstand manipulations during manufacture and handling, and also to survive operating conditions. It is an advantage of constructions according to the present invention that the media for many effective filter systems can be provided without the use of "electrically charged" or "statically charged" fibers. Thus, certain preferred systems according to the present invention use fibers without static charge applied to them. In addition, it is an advantage that the coarse support can be provided from readily available fibrous material such as polymeric fibers. Thus, commercially available materials can be chosen as the coarse support or scrim.

d. The material from which the coarse support is formed should be one to which the fine fibers can be readily and conveniently applied.

While the size of the fine fibers will be selected at least in part depending upon the particular use for which the construction is intended, the diameter of the coarse fibers is less important to preferred filter operation, provided the minimal properties described herein are obtained. In general, it is foreseen that in typical and preferred applications the fiber diameters of the coarse fibers will be at least about 6 times, and typically and preferably about 20–200 times, the fiber diameters of the fine fibers. In typical arrangements wherein the fine fibers have a size of about 0.2–3.0 microns, it is foreseen that the coarse material will comprise a fibrous material having an average diameter of about 10 to 40 microns, and typically 12 microns or larger. The coarse material will typically have a basis weight within the range of 6.0 to 45.0 g/m$^2$, for preferred arrangements.

In general, the coarse fiber layer may comprise a collection or mix of short fibers or a non-woven substantially continuous fiber matrix. In this context, the term "continuous" means fibers having an aspect ratio which is sufficiently large to essentially be infinite, i.e. at least 500 or above. Wet-laid materials may be utilized for the non-woven support; however, air-laid also may be used in some systems.

In general, it is believed that commercially available fibrous scrims can be used as the coarse support. One such scrim is Reemay 2011, commercially available from Reemay Co. of Old Hickory, Ind. 37138. In general, it comprises 0.7 oz., spunbonded polyester.

Alternatively, Veratec grade 9408353, spun bonded polypropylene material, from Veratec, Walpole, Mass. 02081, is usable.

The coarse support layer can comprise a mixture of fibers of different materials, lengths and/or diameters.

2. The Fine Fiber Network or Web

It is foreseen that a wide variety of materials may be selected as the material from which the fine fiber web or network is provided. The following general principles apply to its selection.

a. It should be a material that can be readily formed into fibers with the relatively small diameter selected, for application to the coarse support, or into a web or network of such fine fibers.

b. It should be a material which is sufficiently strong to remain intact during handling and during the filtering operation.

c. It should be a material which can be readily applied to the coarse support.

Hereinabove, reference was made to certain products prepared and sold by Donaldson Company, the assignee of the present invention, under the trade designation Ultra-Web®. These products comprise a fine fiber web applied to a cellulose surface media. The process used for the generation of these fine fiber webs, in the Ultra-Web® products, is a proprietary trade secret of Donaldson Company. It is foreseen, however, that similar techniques and webs, applied to coarse support structures as described herein, and used in stacked arrangements as described herein, would comprise appropriate and useable applications of the present invention. This will be made more apparent by the examples below. Other types of fibers and processes, for example melt-blown processes, can just as effectively be used, however.

In general, for typical constructions according to the present invention, it is foreseen that the fine fiber component will be provided with fiber diameters of 8 microns or less, typically less than 5.0 microns, and preferably about 0.1–3.0 microns depending upon the particular arrangement chosen. A variety of filter materials can be readily provided in such diameters including, for example: glass fibers; polypropylene fibers; PVC fibers; and, polyamide fibers.

More generally, polyacrylonitrile can be used; polyvinyladine chloride available from Dow Chemicals, Midland, Mich. as Seran® F-150 can be used. Other suitable synthetic polymeric fibers can be used to make very fine fibers including polysulfone, sulfonated polysulfone, polyimid, polyvinylidine fluoride, polyvinyl chloride, chlorinated polyvinyl chloride, polycarbonate, nylon, aromatic nylons, cellulose esters, aerolate, polystyrene, polyvinyl butyryl, and copolymers of these various polymers.

The fine fibers can be secured to the coarse support in a variety of manners. The technique used may depend, in part, on the process used for making the fine fibers or web, and the material(s) from which the fine fibers and coarse fibers are formed. For example, the fine fibers can be secured to the coarse support by an adhesive or they may be thermally fused to the coarse fibers. Coarse bicomponent fibers with a meltable sheath could be used to thermally bond the fine fibers to the coarse fibers. Solvent bonding may be used, thermal binder fiber techniques may be applicable, and autogenous adhesion may be used. For adhesives, wet-laid water soluble or solvent based resin systems can be used. Urethane sprays, hot melt sprays, or hot melt sheets may be used in some systems. In some instances, it is foreseen that adhesives for positive securement of the fine fiber web to the coarse support, will not be needed. These will at least include systems in which, when the overall composition is made, the fine fiber is secured between layers of coarse material, and this positioning between the two coarse layers is used to secure the fine fiber layer or web in place.

Figure 20:
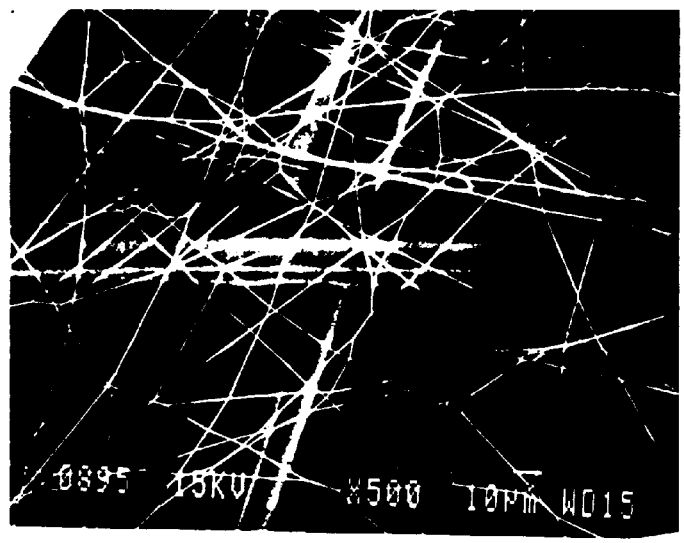
FIG. 20 is a scanning electron micrograph of a media according to a fifth embodiment of the present invention.

Herein reference is made to the fine fiber layer comprising "fine fibers" or a "network or web" of fine fibers. The term "network" or "web" of fine fibers in this context is meant to not only refer to a material comprising individual fine fibers, but also to a web or network wherein the material comprises fine fibers or fibrils which join or intersect one another at nodes or intersections. An example of such an arrangement is shown in FIG. 20, discussed in greater detail below. From a review of the FIG., it can be seen that the network of fine material generally comprises a plurality of very fine fibers or strands, some of which extend from nodes or points of intersection.

F. Some Manners of Characterizing a Layer of Media Used in Constructions According to the Present Invention In general, from the above it will be apparent that a layer of media used in constructions according to the present invention will generally include a coarse support or matrix having a layer or web of fine fibers secured to at least one surface thereof. The coarse support (or matrix) and fine fibers may be generally as previously described. The overall layer may be characterized in a variety of manners, including, for example, simply as comprising coarse and fine fibers as described and also arranged as shown.

It is not accurate to characterize preferred media according to the present invention as comprising a "mixture" of the fine fibers with the coarse fibers. The material is not generally constructed as a mixture of such fibers, i.e., an arrangement wherein the fibers are entangled. Rather the fibers are located, within the media, in separate and discrete zones or regions. More specifically, any given one of the composite layers generally comprises the layer of coarse material having at least one surface on which is applied the fine material. Even when the media is provided in multilayer (stacked) arrangements, the regions of fine fiber and coarse fiber are generally separately encountered as air passes through the "stack".

As will be apparent from the overall description herein, a variety of methods can be utilized to prepare stacked arrangements according to the present invention. In some, for example when the layers are wet-laid to achieve the embodiment, there may be some entanglement of the fine and the coarse fibers. The degree of entanglement would of course not be to such an extent that the fine and coarse fibers would be a "homogenous mix" or the media would not perform desirably according to the principles of the present invention. In general the coarse layers would still be used to separate the various fine fiber layers from one another, in the arrangement. Herein, when the fine fiber layers are described as "discrete" relative to one another and relative to the coarse fiber layers, it is not meant that there is absolutely no entanglement, but rather the construction is such that the multi-layer, i.e. separated fine fiber layer, environment is provided for filtration, as the fluid to be filtered passes through the arrangement. In general this will mean (when the layers are discrete) that such entanglement that may occur is relatively low. Generally the entanglement between the fine fiber layers and coarse fiber layers, if it occurs at all, will only involve a relatively small percent by weight of the fine fibers, typically less than 15%.

As a result of possessing the structure described in the previous paragraph, a homogenous filter media is not presented to the air flow. That is, as the air passes through the filter arrangement, at various depths or levels, different materials are encountered. For example, in some systems the air would pass through alternating rows of fine fiber material and coarse material, as it passes through the system. Important advantages result from this.

In typical arrangements, the composite layer of media may be characterized with respect to the mass of fine fiber applied per unit area of a surface of the coarse support or scrim. This is sometimes referred to as the basis weight of the fine fiber layer. Such a characterization will be varied depending upon the particular fiber diameter used, the particular material chosen and the fiber diameter and the particular fine fiber population density or filter efficiency desired for the layer. It is foreseen that in typical, preferred constructions having fine fiber diameters of about 0.1 to 5.0 microns, the mass of material from which the fine fibers are formed, applied per unit surface area of scrim or coarse support (or matrix), will be within the range of about 0.2 to 25 $g/m^2$, regardless of the particular material used.

An alternate method to characterize a typical and preferred media layer in constructions according to the present invention is with respect to the amount of interfiber space open or visible, when looking into the coarse fiber support or scrim (from the fine fiber side), that is occupied by or covered the fine fibers or web of fine fibers. This method of characterization will be understood, in part, from consideration of FIGS. 16–20.

FIGS. 16–20 are scanning electron micrographs, at various magnifications, of various examples of scrim with a fine fiber web according to the present invention on one surface thereof. The coarse support comprises a matrix of polyester fibers of 25 to 35 microns in diameter. The fine fibers generally comprise glass fibers from about 0.1 to 3 microns in diameter.

The percentage of the area of the open pores in the scrim, occupied by the fine fibers, by area, can be estimated from evaluation of SEMs such as that depicted in FIGS. 16–20. It is foreseen that for typical and preferred constructions according to the present invention, the average percentage of the open area in the coarse support or scrim occupied by the fine fibers, when evaluated using such a method, will be 55% or less, typically about 20 to 40% for preferred air filter media. It is not meant to be suggested that constructions outside of these ranges will be inoperative, but rather that such percentages are typical and are associated with generally operable and effective materials.

Another manner in which one can characterize some layers of material according to the present invention, arrangeable for use in a filter construction as described, is with respect to observations about performance, when the material is tested in an air flow stream. In particular, in general after testing in an air flow stream for efficiency as described herein, it will be observed that a majority of particles (both by number and by mass) stopped by the layer will be engaged by the fine fibers, rather than the more coarse construction, in many preferred embodiments. An example of this is shown in the electron micrograph of FIG. 21.

Alternatively, or analogously, the efficiency of any given composite layer can be assigned, based upon empirical observation. In general, if a coarse fiber support structure or matrix comprising fibers having an average diameter of at least 10 microns, and also having an efficiency of 6% or less, for 0.78 $\mu$ particles when evaluated as described herein, is improved by application of at least one fine fiber layer thereon, wherein the fine fibers have an average fiber diameter of about 5 microns or less, such that the improved material when tested has an efficiency of at least about 8%, and preferably at least 10%, for the 0.78 $\mu$ particles defined, the construction will be one which has at least some of the desirable properties for use in at least certain preferred arrangements according to the present invention. Preferably, the material comprises a scrim having an efficiency of about 4% or less for 0.78 $\mu$ particles, to which sufficient fine fibers have been applied to provide a composite efficiency of at least 10% or more for 0.78 micron particles. In such arrangements, preferably the coarse fiber layer is a material having a permeability, without the fine fiber layer applied thereto, of 250–450 meters/min. Also, typically the fine fiber material is arranged such that the permeability of a single composite layer of the fine fiber/coarse fiber combination is at least about 10 meters/min, more preferably at least about 25 meters/min. In some instances it may be chosen to be significantly higher, i.e. 100–325 meters/min.

G. Permeability

Herein reference is made to the permeability of: any given layer of scrim materials; a composite or layer of scrim with at least one layer of fine fiber thereon; and the overall media composite. In these contexts, the numerical references to "permeability" are in reference to the media face velocity (air) required to induce a 0.50 inch $H_2O$ restriction across a flat sheet of the referenced material, media or composite.

In general, permeability of a media layer, as the term is used herein, is assessed by Frazier Perm Test according to ASTM D737, using a Frazier Perm Tester available from Frazier Precision Instrument Co., Inc., Gaithersburg, Md., or by some analogous test.

Typical media arrangements according to the present invention, especially when used in auto cabin air filters, ventilation systems or engine air induction systems, will have an overall permeability of at least 6 meters/min, and more preferably 10–20 meters/min, with permeability being a function of the overall efficiency, number of layers and size of selected fibers. By "overall" in this context, reference is made to the complete media stack.

H. Efficiency

Herein throughout, reference to the efficiency of a layer or composite, in specific numerical terms, is sometimes made. That is, sometimes a selected layer of scrim, or scrim with at least one layer of fine fiber material thereon, will be described with respect to a preferred percentage efficiency. Also, in some instances, numerical percentage efficiencies are described in connection with an overall composite, comprising multiple layers of material. In these contexts, and to provide the numerical characterizations made, "efficiency" is typically meant to refer generally to the percentage of test particles retained, when the material characterized is tested according to the method of ASTM 1215-89, incorporated herein by reference, and wherein the test material applied is 0.78 micron diameter, mono-dispersed, polystyrene latex spheres, such as those available from Duke Scientific, Palo Alto, Calif., tested at 20 feet/min. (about 6 meters/min).

From the above it is not meant to be suggested that when a filter arrangement according to the present invention is generally described as "efficient", it is merely described with respect to its operation in filtering 0.78 micron particles under the test conditions of ASTM 1215-89. Rather, efficiency for such particles and under such test conditions is merely one relatively reproducible manner in which materials used, or to be used, in constructions according to the present invention can be evaluated or characterized.

I. Fiber Spacing; Weight of Fine Fiber Applied Per Unit Area of Coarse Substrate As indicated above, materials according to the present invention can be characterized with respect to either fiber spacing or the amount of fine fiber material applied per unit area of the coarse substrate or scrim (basis weight). Methods usable to accomplish this are as follows.

1. Area Solidity by Digital Image Analysis

The method employed here is to scan an SEM photo into a computer for image analysis. Usable SEM magnification depends on the size of the fibers of interest in the media structure and should be selected so the edges of the fibers to be analyzed are distinct from the background. As magnification is increased, the depth of the viewing field is reduced. After scanning, one can use commercially available software such as Visilog (from Noesis Vision of Ville St. Laurent, Quebec, Canada) to separate the image into foreground and background by setting a grayscale threshold value which defines the border between foreground and background, and converting the scanned grayscale image into a binary image (foreground and background). A more refined separation of the foreground and background binary image can be achieved through the use of the erode and dilate commands. Items of interest are the fine fibers in the foreground. (Assuming the media to comprise scrim having fine fibers applied to only one surface thereof; and, also assuming the SEM orientation being to show the fine fibers toward the viewer.) Once separated, screen pixels used to display the foreground and the background can be counted using analysis tools within the software. The ratio of the number of pixels used to display the foreground (fine fibers) divided by the number of pixels used to display the area of interest (AOI=foreground+background) from which the fine fibers were taken, represents the area solidity. Fibrous structures are 3-dimensional, while SEM photos represent a projection of a 3-dimensional object onto a plane or area, hence the term "area solidity".

2. Digital Pore Size Analysis

The method employed here is to scan an SEM photo into a computer for image analysis, again using commercially available software such as Noesis Visions Visilog. Usable SEM magnification depends on the size of the fibers of interest in the media structure and should be selected so the edges of the fibers to be analyzed are distinct from the background. As magnification is increased, the depth of the viewing field is reduced. After scanning, one can use commercially available software such as Visilog by Noesis Vision, to separate the image into foreground and background by setting a grayscale threshold value which defines the border between foreground and background, and convert the scanned grayscale image into a binary image (foreground and background). A more refined separation can be achieved through the use of the erode and dilate commands. Items of interest are the pores created by the fine fibers in the foreground. Next, items in the image's AOI which represent anomalies to the software's analysis tools need to be removed from the AOI. Such anomalies include convex pores and pores that lie partially inside the original AOI, i.e. the borders of such pores are not fully defined. Software tools can then be used to calculate the perimeter, area, and aspect ratio in pixel dimensions for each cell inside the revised AOI. A shape factor defined as:

$$(4\pi \times \text{Pore Area})/(\text{Measured Pore Perimeter})^2$$

for each pore, inside the revised AOI, can be calculated. From the scanner resolution, SEM photo magnification, and software output, one can convert interfiber spacing dimensions from pixel units to engineering units. The procedure should be repeated sufficiently to ensure a representative figure (or distribution) for the sample.

3. Line Fiber Intersection Method

First, SEM photos of media samples of appropriate magnification and number to determine the fiber size distribution of the media are taken. For fiber sizing, magnifications typically range from 1,000 to over 6,000×. From another set of SEM photos, magnified such that at least 15 to 50 pores appear in the photo, a grid of lines can be superimposed onto (a magnified copy of) the SEM. Using randomly selected lines from the superimposed grid, the number of fibers intersecting the randomly selected grid lines can be counted so that the number of intersections per inch of line is known. By accumulating data for a statistically significant number of lines, one can calculate average interfiber spaces and devise a distribution of interfiber distances. The procedure should be repeated sufficiently to ensure a representative FIG. (or distribution) for the sample.

4. Basis Weight

The fine fiber weight applied per unit area (surface) of coarse support or spacing matrix (for example Lbs/3000 ft$^2$ or grams/m$^2$) can be used to estimate interfiber space dimensions since in typical constructions the fine fiber mat of interest approximates a monofiber layer. Alternately, if the fiber structure is not a mono layer, and the thickness of the fiber mat can be determined, then volume solidity can be calculated, which is a fiber spacing index.

5. Pore Size a. Mitered Cylinder Geometry:

Usually, where layers of fibers are in intimate contact, pores are assumed to be square with mitered fiber intersections, and layers are randomly oriented relative to each other. Ref "Fluid Filtration: Gas Volume 1" ASTM Special Technical Publication 975, © 1986, ASTM publication 04-975001-39, Donald R. Monson—"Key Parameters Used In Modeling Pressure Loss Of Fibrous Filter Media".

| | |
|---|---|
| L = | centerline distance between parallel fibers on opposite sides of assumed square pore. |
| $d_f$ = | mean square fiber diameter. |
| b = | L − $d_f$ = interior pore size dimension, excluding thickness of fibers framing the pore. |
| C = | solidity = fiber volume/media volume. |
| R = | L/$d_f$ |

Using the above definitions, consistent units of measurement, and the following equations developed by Monson, the interfiber distance "b" can be estimated from the following equations:

| | |
|---|---|
| R = | $1/\{1.1781 - (1.3879 - 1.5 \times C)^{1/2}\}$ |
| b = | $(R - 1) \times d_f$ | b. Mitered Cylinder Geometry: Modified

This model corrects for spacing between consecutive layers of fibers, assumes an inter layer distance of L/2, and is considered valid for values of C<0.6.

| | |
|---|---|
| R = | $1.4472/(.5 \times C)^{1/2} \times \cos\{1/3 \times \cos^{-1}[-0.87979 \times (.5 \times C)^{1/2}]\}$ |
| b = | $(R - 1) \times d_f$ | c. Mitered Cylinder Geometry: Modified for Mono Layer Fiber Structure

| | |
|---|---|
| R = | $(0.5 \times \pi/C) + (\{0.5 \times \pi/C\}^2 - \{8/[3 \times C]\})^{1/2}$ |
| b = | $(R - 1) \times d_f$ |

J. Design of a Filter Media Composite Using Principles According to the Present Invention From previous descriptions it will be understood that, generally, filter constructions using media according to the present invention will be organized with the media comprising layers, more specifically layers of fine fiber separated or spaced apart by the coarse scrim material or coarse fiber matrix. In many instances of designing an air filter construction, then, the engineers will be engaged in a process of selecting the nature of the individual layers and determining how they should be organized in the overall composite. In this section, considerations with respect to this process are briefly discussed.

In general, the selection will depend in part upon the use to which the filter media is to be applied and how the media is made. The intended use will generally result in a definition, for the filter designer, of the efficiency of the filter and permeability needed. The efficiency for a given use may be defined by means other than by ability to trap 0.78 micron particles under the test conditions provided above. For example, the manufacturer of an automobile may have specific specifications for the operation of a cabin air filter, which the filter engineer is to meet using materials according to the present invention. That specification might be defined with respect to the ability to trap particles under test conditions that are not equivalent to those defined herein with respect to 0.78 micron particles. The engineer could use the techniques described herein to approximate the possible construction, and then develop appropriate testing to see that the specifications provided by the automobile manufacturer are met. As an alternative, after sufficient testing, the engineer may develop sufficient correlation data to be able to predict performance under one type of condition, based upon tests conducted under another.

In any event, in general it is foreseen that in some instances the design process will begin with the engineer considering available materials, that possess properties according to the present invention. As an example, the engineer may select a scrim and obtain various samples of the scrim material with various amounts of fine fiber material applied thereto. As a hypothetical example, assume that the engineer has had various samples of scrim material comprising Reemay 2011 treated with fine fiber glass material in various amounts, on only one surface thereof, to create eight samples in which the fine fiber layers are characterized by the following:

| Glass Fiber Schuller #106[1] (0.4µ) fiber | | | | | |
|---|---|---|---|---|---|
| Glass Wt in Hand Sheet Former | Single Layer | Single Layer LEFS | Area 2 0.44 ft² Slurry Glass Weight/Unit Area | | |
| Slurry (g) | perm (fpm) | Effic (%) | g/ft² | g/m² | Lb/ 3000 ft² |
| 0.035 | 818.6 | 6.7% | 0.079 | 0.848 | 0.520 |
| 0.040 | 686.1 | 8.8% | 0.090 | 0.969 | 0.595 |
| 0.075 | 282.2 | 25.5% | 0.169 | 1.816 | 1.115 |
| 0.100 | 189.7 | 32.6% | 0.225 | 2.422 | 1.487 |
| 0.150 | 123.8 | 54.5% | 0.338 | 3.633 | 2.230 |
| 0.200 | 88.0 | 68.8% | 0.450 | 4.844 | 2.974 |
| 0.380 | 33.7 | 94.3% | 0.855 | 9.203 | 5.650 |
| 0.600 | 21.0 | 99.1% | 1.350 | 14.531 | 8.921 |

[1]Schuller #106 is a glass fiber having a median fiber diameter of 0.4 microns, available from Schuller Filtration of Littleton, CO 80162.

Given the above-available information and materials, the filter engineer could conduct the designing process. In general, the efficiency of the composite for the 0.78 micron particles under the test conditions defined, will be the "sum" of the efficiency of each of the layers. For example, if two layers are used, each of which is 35% efficient, an overall efficiency of $1-[(1-0.35)\times(1-0.35)]$ or 57.75%. Thus, from knowledge about the various layers, the engineer is in a position to be able to determine how many layers and which materials to use, in order to achieve a desired level of efficiency.

In the previous paragraph, a general formulation for determining efficiency in a multilayer system was presented. The specific calculation was made according to the following principles:

For a stated particle size and velocity:

| | |
|---|---|
| $\eta_i =$ | layer efficiency for layer i |
| $\eta_t =$ | total composite efficiency |
| $1 - \eta_i =$ | layer penetration for layer i |
| $1 - \eta_t =$ | total composite penetration |
| $(1 - \eta_t) =$ | $(1 - \eta_1)(1 - \eta_2)\ldots(1 - \eta_i)$ |

In general, the overall permeability of the composite can be determined from the permeability of the various layers in the composite according to the following mathematical relationship:

$$\rho_{comp} = \frac{1}{\frac{1}{\rho_1} + \frac{1}{\rho_2} + \ldots \frac{1}{\rho_i}}$$

wherein:

| | |
|---|---|
| $\chi_{composite} =$ | permeability of the total composite |
| $\rho_i =$ | permeability of component layer of composite comprising either: layer of coarse + fine; or layer of coarse alone, depending on construction. |

Thus, with knowledge about permeability of the various layers, the engineer can know what the permeability of the overall composite will be; and, various layers can be chosen to provide a particular desired permeability. As an example, the typical face velocity of a cabin air filter is 50–70 ft/min (about 15–24 meters/min) and such an arrangement operates with an air flow of 220–300 ft³/min (about 6.2–8.5 meters³/min). This can, for example, be achieved with a filter made of the following composite:

1. An upstream layer or matrix that is 30% efficient;
2. A next downstream layer or matrix that is 35% efficient;
3. A next downstream layer or matrix that is 45% efficient.

The composite would then be about 75% efficient.

It can be seen, then, that if the engineer knows: what permeability (under the test conditions used to define the permeability of the given layers) is desired for the overall composite; and, the engineer has determined what the efficiency of the various layers is, and knows what the efficiency of the overall composite under similar conditions is desired to be, the engineer can readily select from among the materials to achieve the desired results.

The engineer may wish, of course, to take into consideration other variables or factors. For example, fewer layers may be associated with a thinner composite, and in some instances a preferred overall organization. Cost, availability of materials for any given layer, and other related factors may be of concern. Also, the resulting physical properties of the composite, for example with respect to ease of formation of a pleated construction, may be of concern.

As an example of the kinds of considerations that can be taken into account by the filter designer in selecting the materials, consider the following. If two sheets of material of the same area, one of which is substantially thicker than the other, are pleated, in general the number of pleats that can be effectively positioned within a given volume will be greater for the thinner sheet. Thus, if the filter design problem is to create an efficient filter for a given cylindrical space, the engineer may have a preference for a thinner pleated material, relative to a thicker one. If the pleated material is to be made from layers of media according to the present invention, the engineer may prefer to select a combination of layers that leads to a relatively thin overall construction, as opposed to a thicker one, to advantage.

However, in general in comparing composites of equal overall efficiency, a thicker composite will generally have a longer life (on an equal area basis) than a thinner one. This factor would be balanced by the engineer against the concerns of the previous paragraph, in designing some systems.

It is foreseen that in some instances the engineer will desire to have all layers of the stack comprise the same composite material. However, in other instances different materials (or efficiencies etc.) may be used in some or all of the layers. It is foreseen that in typical operations, should the engineer determine to have layers of different efficiency in the composite, in general the resulting efficiency gradient will preferably be arranged such that the efficiency of the composite layers generally increases toward the downstream side of the construction. That is, it is presently foreseen that the preferred organization of layers will be such that more efficient composite layers are further downstream than less efficient composite layers, so that longer life results. The reason longer life generally results under such circumstances is that the higher efficiency layers will not occlude as rapidly if positioned on the downstream side, since the less efficient layers will have operated to provide at least some filtering before the fluid stream reaches the more efficient layers. This means that the more efficient layers will tend to occlude less rapidly than they would if positioned further upstream.

K. Geometry

Media according to the present invention may be arranged in a wide variety of geometric configurations, to advantage. For example, flat sheets can be arranged in a simple stack to form media for a non-pleated panel type filter.

Of course, the sheets can be arranged as a blanket or wrap around an item, for example as a cylindrical wrap around a cylindrical structure.

Uniquely, a media according to the present invention can be provided in a form such that it can be readily pleated. In some instances, this will be accomplished by selecting the spacing scrim such that when stacked, the resulting composite has sufficient strength or "body" to be pleated and to retain the pleated configuration. This is illustrated schematically in FIGS. 8A and 8B.

Figure 8:
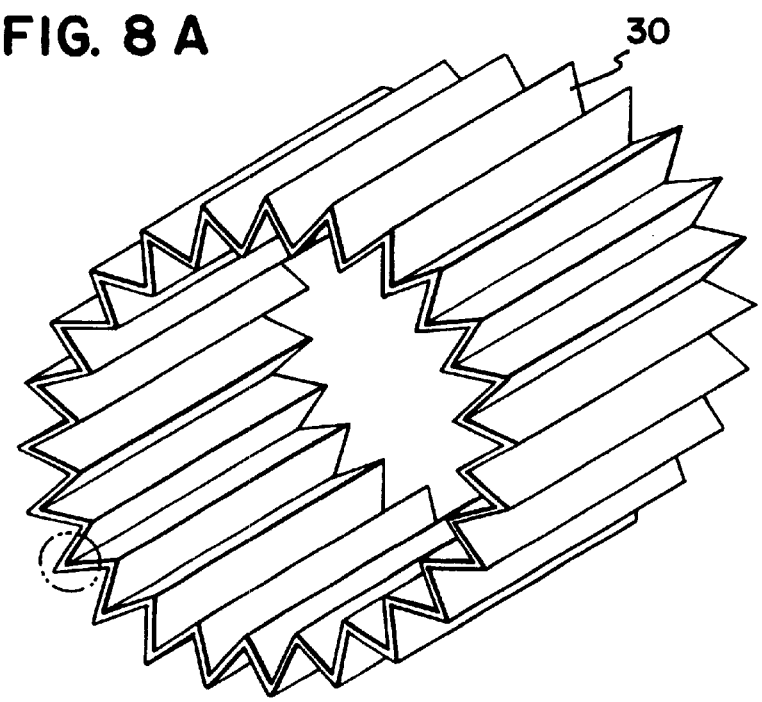
FIG. 8A is a fragmentary schematic perspective view of a pleated media arrangement including a media construction according to the present invention.
FIG. 8B is an enlarged fragmentary schematic cross-sectional view of a portion of the arrangement shown in FIG. 8A.
Figure 8B:
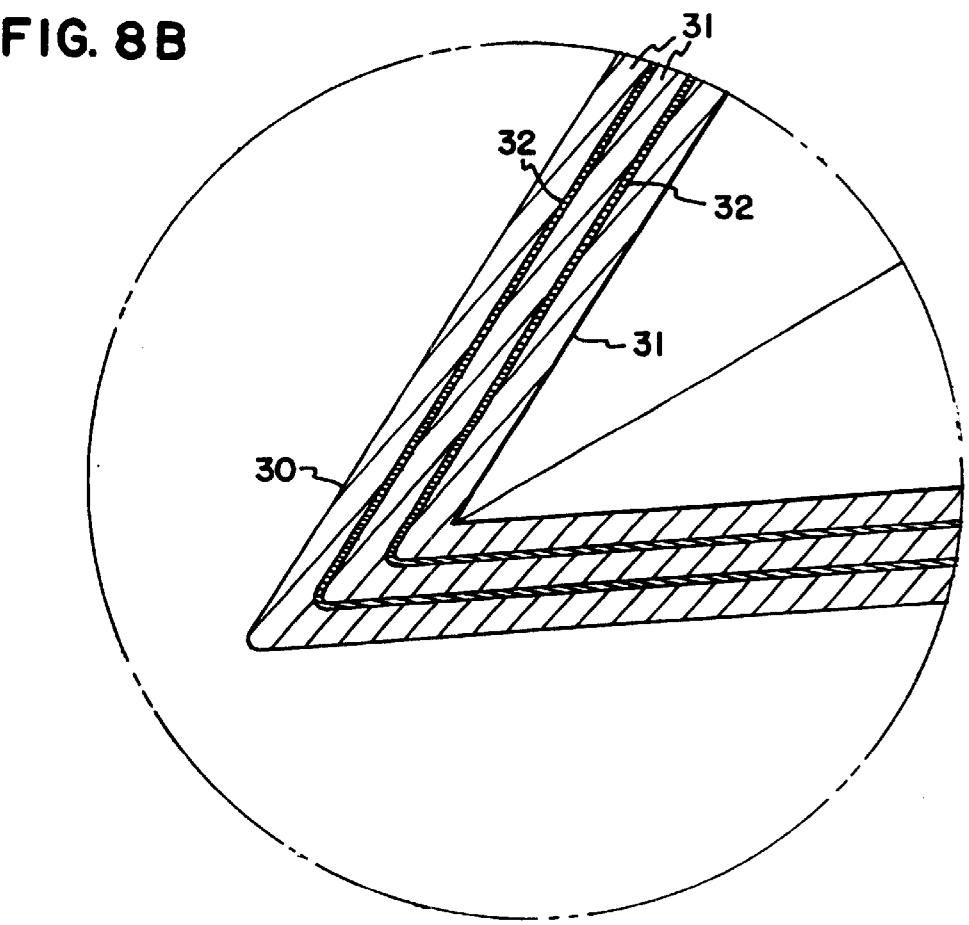

Referring to FIG. 8A, filter media 30 is depicted in a pleated, cylindrical configuration. In FIG. 8B, a portion of the material is shown in exaggerated blow up, so that it will be understood the material comprises a plurality of layers. Referring to FIG. 8B, material 30 includes coarse layers 31 with layers 32 of fine fibers positioned therebetween. In general, it is foreseen that for many preferred arrangements, the number of pleats, whether arranged cylindrically or in a panel, will be about 1 to 15 per inch (or per 2.5 cm). When a cylindrical configuration is described, the number of pleats per distance reported herein is with respect to the inner diameter of the cylindrical construction.

A pleated, cylindrical configuration according to the present invention is unique at least for the reason that media according to the present invention greatly exhibits the properties of depth media systems, with respect to loading and operational face velocities. However, conventional depth media is not generally pleated. More specifically, pleated constructions are generally associated with paper or cellulose surface loaded systems. However, the principles of the present invention can be utilized to provide an arrangement which operates as a form of depth media, but which can be configured in a pleated manner more similarly to surface loaded cellulose media.

It is noted that for some arrangements a sinusoidal (weave or pleat-like) arrangement can be provided even though sufficient body is not provided by the media to retain a truly pleated configuration. Several methods for accomplishing this are foreseeable. In the first, the "body" can be provided by having only one or a few layers of material (in the media) possess sufficient body. For example, one or two layers of scrim in a multilayer system can be enough for this body without requiring all of the layers to possess it. In addition or alternatively, support layers of material within, or on one side or both sides of, the stacked arrangement may be used to provide this body or mechanical integrity. Such a composite can be made using commercially available synthetic or cellulosic fibers as the support layers.

Figure 9:
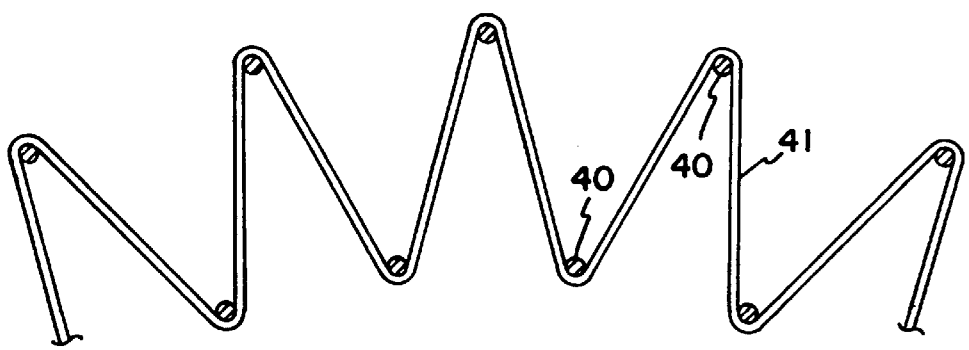
FIG. 9 is a schematic representation of a media according to the present invention threaded on a mechanical support structure.

A second approach to providing a sinusoidal arrangement without having the coarse scrim layers form pleats, is to utilize a mechanical framework to maintain the material in the pleated construction. A schematic with respect to this is illustrated in FIG. 9. In FIG. 9, mechanical stays 40 are depicted, with media 41 threaded thereon.

Other approaches may involve sufficient thermal, chemical or physical treatments of the material to provide sufficient rigidity to retain a pleated configuration or corrugation. Pleat tip bonding approaches may also be used. Also, metal ribbons or wires positioned within the various composite layers can be used to maintain a pleated configuration.

From the above considerations, it will be apparent that an advantage of the present invention is that it may be applied in materials providing for a wide variety of geometric configurations. Thus it can be applied in a great many filter constructions to advantage. As indicated above, the properties of the materials may be selected so that the depth needed, for efficient operation, can be varied as desired.

L. An Air Filter Construction

Media according to the present invention may be utilized in a very wide variety of air filter constructions. It can be used, for example, as cylindrical pleated material in cylindrical elements. It may also be utilized as pleated material in panel-type filters. It can be used in unpleated forms, for example as sleeve filters inside of other filter elements, or around the outside of other filter elements. It can also be used in unpleated form in cylindrical and panel elements. Indeed, it may find application to replace the media, or a portion of the media in almost any of a wide variety of filtration or filter systems.

In some instances, media according to the present invention may be utilized to enhance the operation of other media, for example other types of commercially available media. Thus, media according to the present invention may be applied on an upstream side of, a downstream of, or between layers of various media, to achieve preferred filter operation. For example, a high efficiency version of media according to the present invention may be used downstream of various media, as a polish filter. A high load, lower efficiency version of media according to the present invention may be utilized on the upstream side of conventional media, to achieve an increase in overall efficiency by utilization as a high load media on the upstream side. Media according to the present invention may also be utilized between layers of conventional media, in various gradient filter systems or related systems.

Figure 10:
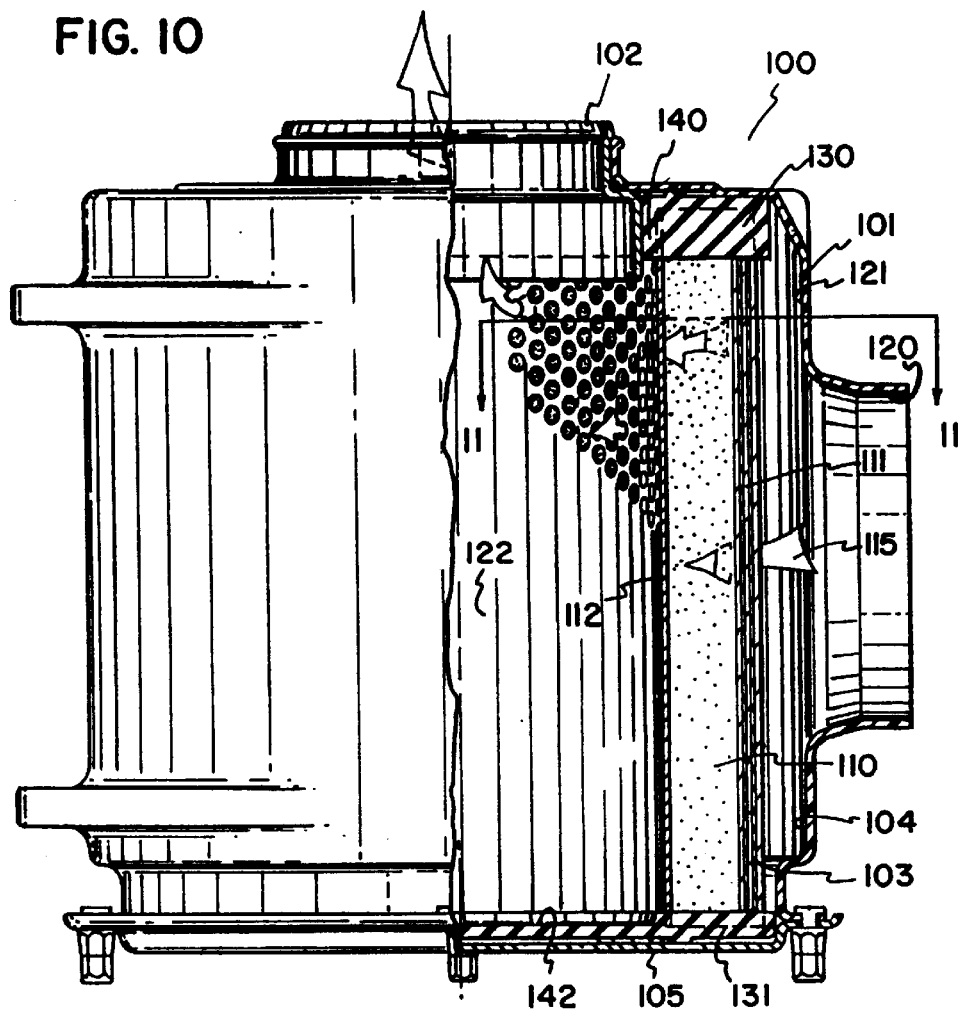
FIG. 10 is a side elevational view of a filter arrangement incorporating a filter media construction according to the present invention therein.
Figure 11:
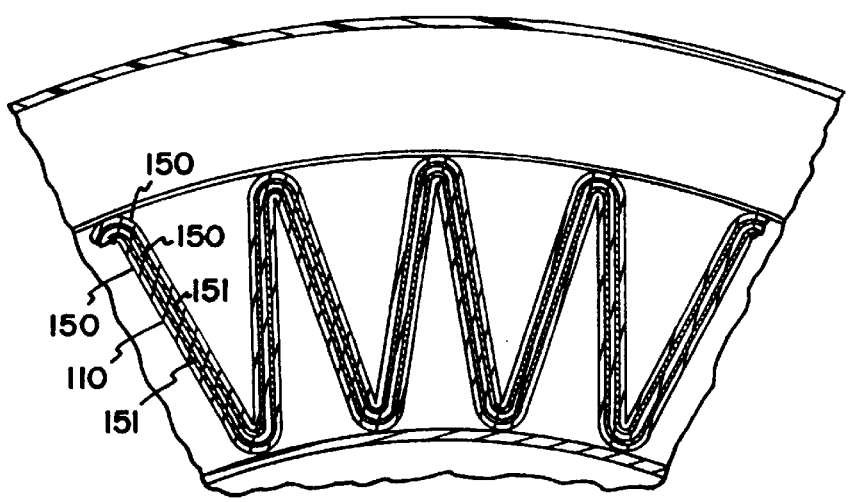
FIG. 11 is an enlarged fragmentary schematic cross sectional view taken generally along line 11—11 of FIG. 10.

One type of filter construction according to the present invention is illustrated in FIGS. 10 and 11. The arrangement of FIG. 10 is generally analogous to that depicted in U.S. Pat. No. 4,720,292, incorporated herein by reference, except that the filter media has been replaced with improved media according to the present invention. Referring to FIG. 10, the filter arrangement 100 depicted includes a housing 101, an outlet tube 102, and a filter element 103. Access to an interior 104 of the housing 101 for maintenance of the filter element 103 is through hatch or cover 105.

The filter element 103 generally comprises pleated filter media 110, outer liner 111, and inner liner 112. For the arrangement shown in FIG. 10, air filtration occurs by air passage in the general direction of arrow 115. Thus, housing 101 includes inlet 120 for air to be filtered. The air is distributed in chamber 121, before it passes through filter element 103. The air then enters internal chamber or bore 122, and exits the filter element throughout outlet member 102.

The filter element 103 includes first and second opposite end caps 130 and 131, respectively. The filter media 110 is secured to, embedded within and extends between, the end caps 130 and 131. End cap 130 is sized and configured to form a radial seal with outlet tube 102, in region 140. End cap 131 closes end 142 of the filter element 103, in a conventional manner.

In FIG. 11, a portion of the arrangement shown in FIG. 10 is depicted in a schematic cross sectional view. It can be seen that the filter media 110 is a multi-layer arrangement according to the present invention, and contains a plurality of layers 150 of coarse material, and spaced apart layers 151 of fine fiber material. The particular arrangement shown in FIG. 10 has two fine fiber layers 151 spaced apart and sandwiched by a total of three coarse layers 150. Again, according to the principles of the present invention, a variety of alternate arrangements ay be utilized as the filter media 110.

The media is shown, in FIGS. 10 and 11, incorporated in a cylindrical element constructed for radial sealing with the outlet tube. The media may also be used in filter elements for axial sealing arrangements.

In general, the invention can be used to prepare media having high loading capacity when compared to surface-loading media, but its loading advantages are believed to be more pronounced when the operation is for filtering a fine particulate matter, by comparison to filtering to collect more coarse matter. Therefore, by pleating the invention and placing it downstream of some depth media, advantages can be obtained, since the depth media would collect the coarse particles relatively efficiently, allowing enhancement of the filtration process due to the high efficiency for fine particular matter of media according to the present invention. The utilization of depth media upstream for more efficient filters is described in U.S. Pat. Nos. 5,082,476; 5,238,474; and 5,364,436 and using similar techniques but having downstream from the depth media, media according to the present invention, advantages can be obtained. For example, depth media such as those described in the above patents can be used to remove particles, very efficiently, in a size ranges from 2–10 microns upstream from media according to the present invention, with the media according to the present invention used to achieve very high efficiency removal of sub-2 micron materials, downstream. Thus, media according to the present invention can be used in a complimentary manner, with more conventional techniques.

In some applications, media according to the present invention may be configured such that it is not pleated, but rather such that it is located downstream of depth media and used in either a panel or cylindrical filter element. The media may be a separable component from a remainder to the filter assembly, such as a serviceable replacement part. The media according to the present invention may also be utilized upstream above the filter components, as a replacement part. Methods of using replaceable media sections are described, for example, in the above U.S. patents, and also in U.S. application Ser. No. 08/426,220, incorporated herein by reference.

M. Positioning of the Fine Fiber on the Coarse Support; Orientation of the Fine Fiber Layer with Respect to Fluid Flow As explained above, generally filter material according to the present invention comprises a coarse support with a fine fiber web or mat applied to at least one surface thereof. As should be apparent from evaluation of the drawings, in general a coarse fiber support can be viewed as having two available surfaces for application of the fine fiber, one on each side of the coarse fiber mat. There is no particular reason why a fine fiber mat cannot be applied on opposite surfaces of a layer of coarse material, in at least some useful systems. The coarse material or matrix would serve to separate the fine fiber mats appropriately. It is foreseen that if such arrangements were to be utilized in a stacked manner, in some instances it would be desirable to place a layer comprising only coarse material or scrim between those layers of coarse material having the fine fibers on both sides thereon, to maintain a separation between each layer of fine fibers. However, it is certainly possible that in some instances the amount of fine fiber applied may be selected such that when placed immediately adjacent to a fine fiber layer on another coarse layer, a desired total level of efficiency results.

As to orientation of the material with respect to air flow, in a stacked arrangement no particular preference is perceived. That is, the fine fiber layer may be on either the upstream side or the downstream side, of the mat to which it is applied.

N. Selection of Media for Use in Arrangements According to the Present Invention As indicated above, at present it is generally believed that the factors of most concern regarding the media relate to selecting the materials such that the coarse fibers are well spaced, serve relatively little filtering function, and are appropriately positioned to support the fine fibers and to keep the layers of fine fibers separated from one another in the overall construction. The fine fibers are chosen for their relatively small diameter. Thus, it is foreseen that a very wide variety of materials can be utilized in constructions according to the present invention, and a wide variety of techniques are applicable to the generation of such materials.

In general, techniques for the preparation of fiber materials for use in filter constructions according to the present invention are not within common practices of a filter designer or engineer, but rather are in the field of fiber processing and polymer processing. It is foreseen that companies such as Hollingsworth & Vose, East Walpole, Mass. 03032; and Lydall, Inc., Rochester, N.H. 03867 are knowledgeable in the techniques of generating fine fibrous materials or applying them as layers to other materials. Also, as indicated above, Donaldson Company Inc. has developed some trade secret technology in this area relating to its Ultra-Web® products.

The following references incorporated herein by reference, generally describe the generation of fine or ultra-fine fibers: U.S. Pat. Nos. 2,450,363 (for glass fibers); 4,650,506; Wente, Van A., "Superfine Thermoplastic Fibers," *Industrial Engineering Chemistry*, Vol. 48, p. 1342 (1956); and, Schoffel, Norman B., "Recent Developments with Microglass Media," *Advances In Filtration and Separation Technology*, Vol. 9, p. 184–199 (1995). In general, it is foreseen that many of these materials could be used as a fine fiber web in constructions according to the present invention.

As to the coarse fiber mat or matrix, again a very wide variety of materials including at least the commercially available materials described herein would be useful.

As to the techniques used to generate the fine fiber web and apply it to the surface of the coarse material, again various approaches would be useable, and it is foreseen that the preferred ones for any given application would depend at least in part upon the filter application, processing equipment available, the particular material chosen for the fine fiber web, and the material and process used to manufacture the coarse fiber substrate. At least such techniques as wet-laid processing; air-laid process; melt-blown processing; and polymeric fiber spinning would, in general, be useable.

Although no particular approach to fiber generation or material composition is presently foreseen as most preferred for a useful filter construction, the inventors have evaluated and compared media made from two approaches. One is the utilization of fine fibers comprising glass, as a possible process for preparing media, applied to Reemay 2011. It has been found that the process does generate useable media meeting the general criteria of the present invention. The other is fine polymeric fibers generated by using a modification of the trade secret Donaldson Co. Ultra-Web® process, to apply fine fibers to a substrate of Reemay 2011.

In particular, with respect to glass fibers the inventors have successfully utilized an approach based on a variation of the description in Example 1 of U.S. Pat. No. 5,336,286, incorporated herein by reference, for formation of a useable material. Example 1 of the '286 patent was modified by using glass or glass fibers for the fiber material to be applied, and using as the material on which the fine fibers are deposited Reemay 2011 scrim. In addition, 2 ml of HCl acid (37%) were placed in the water/fiber slurry in a kitchen blender, to chemically disperse the glass fibers.

Thus, as a result of the modifications, the wet-laid deposition occurred by placing the glass fibers onto a Reemay 2011 scrim which had been positioned above the screen, to form a fiber sheet.

Other samples, made using a variation of the Donaldson Co. trade secret Ultra-Web® process, are described below.

No substantial difference in performance for the two types of materials was observed, in comparative testing below. Thus, with respect to the principles of the present invention, there is no basis for a preference from between them.

O. Application of the Techniques Described Herein to Mist Collection

In general, it is foreseen that some of the materials described herein may be utilized in constructions for the filtering of very fine mists from the air. In general, such mists comprise droplets of about 1 micron in size or smaller. At this size, to some extent they can be treated as particles for purposes of evaluating filtration. Certain materials as described herein, then, can be used to trap such mists. In general, high separation efficiency can be obtained without the small interfiber spaces (i.e. pores) typical of high efficiency mist filter media. The small pores of conventional high efficiency media retain the separated liquid due to capillary forces. The retained liquid in such systems rapidly increases buildup of flow resistance to passage of air, which shortens useful filter life. It is foreseen that for such applications, fiber surfaces which are phobic with respect to the fluid being collected can be used to advantage.

P. Liquid Filtration Systems

In general the techniques described herein can be utilized in applications involving a wide variety of fluid streams. Many of the specific descriptions provided thus far have been in association with air or gas flow streams, carrying particulates. It is foreseeable however that the materials described herein may also be utilized in systems for filtration of liquids. That is, the liquids would be directed through the media according to the present invention, with particulates therein trapped as described.

In general, if applied in liquid systems, it is foreseen that the principle of increasing filter media life by increasing the number of spaced fine fiber layers will be substantially the same for liquid as for air, though the collection mechanism is sieving. Because the collection mechanism is believed to be sieving, the composite efficiency of in a liquid application is limited by the efficiency of the single layer with the highest efficiency. Typical efficiencies for liquid applications vary from about 50% for lubrication oil to about 99% for fuel filter media. Therefore practical embodiments of the invention applied to liquid filtration systems would in general be comprised of layers with higher layer efficiencies, than would be utilized in air filtration systems of lower composite efficiencies such as for gas turbines, engine air induction systems, cabin and indoor air ventilation systems. The invention may also provide advantages when applied to air filtration applications with high efficiency requirements such as HEPA grade or ULPA grade filtration in a ventilation system. The invention may provide advantages in terms of filter life and more reliability through multiple layers. Through redundant filtration, the overall system is less sensitive to media flaws in an individual layer.

Q. Further Comments

While evaluating the materials in the following reported experiments, some further observations were made with respect to certain preferred materials according to the present invention. First, the coarse substrate or matrix provides integrity to the very fine fibers and structure, thus reducing the likelihood that the fine fibers are damaged during manufacturing, handling or use. In the absence of the coarse support or matrix, fine fiber structure is very easily damaged upon contact with other materials. The preferred arrangements of the present invention, however, are often so durable, that it is foreseen some constructions can be prepared which can be washed with liquid or cleaned by an air flush, after use, for some regeneration.

It is also apparent that it may be desirable to create arrangements according the present invention through multiple airlaying of layers, onto a substrate. For example, a porous scrim could be laid down, followed by a fine fiber application, a further coarse layer application, a further fine fiber application, etc. Thus, an overall composite could be created by a plurality of air laid fiber steps, in sequence. This may be desirable in certain processing applications. It is anticipated that it would not necessarily result in a substantially different overall operation for the construction, than if it was prepared from individual layers.

R. Still Further Comments

1. Characterizations of Estimated Microfiber Length and/or Microfiber Surface Area Per Unit Area of Coarse Fiber Support.

In previous sections, discussions were presented characterizing certain preferred materials, comprising certain fine fibers (i.e. microfibers) applied to coarse fiber support substrates in terms of the microfiber weight applied per unit area of coarse fiber substrate. With respect to this, attention is directed, for example, to the table appearing in Section "J." as well as to the discussions appearing in Section "F." and "I.4.". Glass is one of the materials characterized herein as useable to form the microfibers. Given a specific gravity of glass of about 2.6 g/cc, it is apparent that one can alternatively characterize the amount of fine fiber (or microfiber)

applied to the coarse fiber substrate in terms of "fiber length per square meter (area) of coarse fiber support media", as well as by weight per square meter (area), for a glass fiber of given diameter. Since the fibers generally have cylindrical outer surfaces, a characterization of "surface area of fine fiber per unit area of coarse fiber support media" is also possible.

In Table R1 below, estimated microfiber lengths per square meter of media and estimated microfiber surface areas per square meter of media for certain selected glass fiber basis weight applications are provided. Specifically, three glass fiber diameters are presented: 0.10 micron diameter; 1.00 micron diameter; and, 3.00 micron diameter. Three specific basis weights are also provided: 0.10 grams per square meter; 1.00 grams per square meter; and 10.00 grams per square meter. Based upon these parameters, and an assumed specific gravity of 2.6 grams/cc, figures presenting the amount of microfiber length applied per square media and amount of microfiber surface area applied per square meter of media are provided in the table.

TABLE R1

| Fiber Diameter (microns) | Basis Weight (g/m$^2$) | Estimated micro-fiber length per sq meter of media (km/m$^2$) | Estimated micro fiber surface area/sq meter of media (m$^2$/m$^2$) |
|---|---|---|---|
| 0.10 | 0.10 | 4,897 | 1.54 |
| 0.10 | 1.00 | 48,971 | 15.38 |
| 0.10 | 10.00 | 489,708 | 153.85 |
| 1.00 | 0.10 | 49 | 0.15 |
| 1.00 | 1.00 | 490 | 1.54 |
| 1.00 | 10.00 | 4,897 | 15.38 |
| 3.00 | 0.10 | 5 | 0.05 |
| 3.00 | 1.00 | 54 | 0.51 |
| 3.00 | 10.00 | 544 | 5.13 |

To facilitate interpretation of the information provided herein in connection with the approach of Table R1 attention is now directed to Table R2 below. In Table R2, the table appearing hereinabove in Section "J." is modified to include an indication of length of fiber and fiber surface area applied in certain ones of the examples, based upon a calculation given an assumed specific gravity of 2.6 grams/cc for glass; and an average fiber diameter of 0.4 microns.

TABLE R2

| Basis Weight (g/m$^2$) | LEFS (%) | Fine Fiber Length Per Unit Media Area (km/m$^2$) | Fine Fiber Surface area/Per Unit Media Area (m$^2$/m$^2$) |
|---|---|---|---|
| 0.85 | 6.7% | 2,595 | 3.26 |
| 0.97 | 8.8% | 2,966 | 3.73 |
| 1.82 | 25.5% | 5,558 | 6.98 |
| 2.42 | 32.6% | 7,413 | 9.32 |
| 3.63 | 54.5% | 11,119 | 13.97 |
| 4.84 | 68.8% | 14,826 | 18.63 |
| 9.20 | 94.3% | 28,167 | 35.40 |
| 14.53 | 99.1% | 44,475 | 55.89 |

In Table R3 below, a similar presentation is made to that appearing in Table R2, except the calculation is based upon an assumed fiber diameter of 2.20 microns.

TABLE R3

| Basis Weight (g/m$^2$) | LEFS (%) | Fine Fiber Length Per Unit Media Area (km/m$^2$) | Fine Fiber Surface area/Per Unit Media Area (m$^2$/m$^2$) |
|---|---|---|---|
| 2.86 | 3.4% | 289 | 2.00 |
| 5.45 | 10.1% | 551 | 3.81 |
| 5.57 | 11.9% | 564 | 3.90 |
| 12.81 | 19.2% | 1,296 | 8.96 |
| 16.95 | 24.1% | 1,715 | 11.86 |
| 26.04 | 35.6% | 2,634 | 18.21 |
| 50.40 | 60.9% | 5,099 | 35.24 |
| 68.73 | 72.1% | 6,954 | 48.07 |

Once the engineer has developed experience with the chosen materials, it is possible to model systems, based in part upon calculation. In Table R4 below are included characterizations of glass fine fiber layers based on assumed material thicknesses, fiber diameters and basis weights.

TABLE R4

| Assumed Layer Thickness (u) | Fiber dia. (u) | BW (g/m$^2$) | Spec Gr (g/cc) | Est LEFS (%) | Fine Fiber Length Per Unit Media Area (km/m$^2$) | Fine Fiber Surface area Per Unit Media Area (m$^2$/m$^2$) |
|---|---|---|---|---|---|---|
| 1.0 | 0.20 | 0.05 | 2.6 | 10% | 612 | 0.38 |
| 1.0 | 0.20 | 0.08 | 2.6 | 16% | 918 | 0.58 |
| 1.0 | 0.20 | 0.10 | 2.6 | 22% | 1,224 | 0.77 |
| 1.0 | 0.20 | 0.15 | 2.6 | 34% | 1,836 | 1.15 |
| 1.0 | 0.20 | 0.20 | 2.6 | 46% | 2,449 | 1.54 |
| 1.0 | 0.20 | 0.25 | 2.6 | 58% | 3,061 | 1.92 |
| 1.0 | 0.20 | 0.30 | 2.6 | 68% | 3,673 | 2.31 |
| 1.0 | 0.20 | 0.35 | 2.6 | 77% | 4,285 | 2.69 |
| 1.0 | 0.20 | 0.40 | 2.6 | 84% | 4,897 | 3.08 |
| 1.0 | 0.20 | 0.46 | 2.6 | 90% | 5,632 | 3.54 |
| 0.5 | 0.20 | 0.05 | 2.6 | 10% | 612 | 0.38 |
| 0.5 | 0.20 | 0.10 | 2.6 | 23% | 1,224 | 0.77 |
| 0.5 | 0.20 | 0.15 | 2.6 | 39% | 1,836 | 1.15 |
| 0.5 | 0.20 | 0.20 | 2.6 | 55% | 2,449 | 1.54 |
| 0.5 | 0.20 | 0.25 | 2.6 | 70% | 3,061 | 1.92 |
| 0.5 | 0.20 | 0.30 | 2.6 | 82% | 3,673 | 2.31 |
| 0.5 | 0.20 | 0.35 | 2.6 | 90% | 4,285 | 2.69 |
| 0.5 | 0.20 | 0.40 | 2.6 | 95% | 4,897 | 3.08 |
| 25 | 5.00 | 0.04 | 2.6 | 9% | 0.78 | 0.01 |
| 25 | 5.00 | 0.08 | 2.6 | 19% | 1.57 | 0.02 |
| 25 | 5.00 | 0.10 | 2.6 | 24% | 1.96 | 0.03 |
| 25 | 5.00 | 0.13 | 2.6 | 31% | 2.55 | 0.04 |
| 25 | 5.00 | 0.15 | 2.6 | 36% | 2.94 | 0.05 |
| 25 | 5.00 | 0.18 | 2.6 | 43% | 3.53 | 0.06 |
| 25 | 5.00 | 0.22 | 2.6 | 51% | 4.31 | 0.07 |
| 25 | 5.00 | 0.26 | 2.6 | 58% | 5.09 | 0.08 |
| 25 | 5.00 | 0.30 | 2.6 | 64% | 5.88 | 0.09 |
| 25 | 5.00 | 0.40 | 2.6 | 76% | 7.84 | 0.12 |
| 25 | 5.00 | 0.50 | 2.6 | 85% | 9.79 | 0.15 |
| 25 | 5.00 | 0.58 | 2.6 | 89% | 11.36 | 0.18 |
| 15 | 5.00 | 0.04 | 2.6 | 9% | 0.78 | 0.01 |
| 15 | 5.00 | 0.10 | 2.6 | 24% | 1.96 | 0.03 |
| 15 | 5.00 | 0.13 | 2.6 | 31% | 2.55 | 0.04 |
| 15 | 5.00 | 0.18 | 2.6 | 42% | 3.53 | 0.06 |
| 15 | 5.00 | 0.22 | 2.6 | 50% | 4.31 | 0.07 |
| 15 | 5.00 | 0.30 | 2.6 | 63% | 5.88 | 0.09 |
| 15 | 5.00 | 0.50 | 2.6 | 84% | 9.79 | 0.15 |
| 15 | 5.00 | 0.58 | 2.6 | 89% | 11.36 | 0.18 |

As is indicated in discussions in previous sections, and by certain of the experiments below, the particular material from which the microfibers were formed is not, in many instances, a critical factor to achieving beneficial effects according to the principles described herein. The amount of fiber, for any given diameter, or amount of fiber surface area, for any given fiber, is typically more important to achieving the desired filtering effects. Tables R1, R2, R3 and R4 indicate a more "generic" approach to characterizing amount of fine fiber applied to the substrate which is, in general, non-specific as to the particular material chosen. That is, by evaluating the amount of fine fiber applied per unit area, by length or surface area, one can remove from the evaluation the variable of the specific gravity of the fine fiber material, i.e. the specific composition of the fine fiber material. Alternately put, the calculations utilizing glass fibers indicate a type of performance expected with a certain amount of fiber length, or fiber surface area, per unit area of substrate, for a given diameter fiber. A substitution of an alternate material to glass, with a similar diameter, fiber length per unit area, or fiber surface area per unit area, would be expected to provide similar filtering properties and efficiencies.

It is noted that characterizations such as fiber length per unit area are effectively indicators of packing density or solidity. As such, they are relatively descriptive of fiber geometries, particularly at low basis weights.

2. Electrostatically Charged Media.

Hereinabove it was indicated that fine fiber applications according to the present invention can be utilized in connection with a variety of additional types of media. The possibility of neutral media or alternatively electrostatically charged media was mentioned.

In particular, it is foreseen that, for example, microfiber applications according to the present invention can be utilized in overall compositions which include a region electrostatically charged media therein. Electrostatically charged media, sometimes referred to as "electret" media, can be utilized as the substrate to which the microfiber is applied; and/or it can be used as a separate layer of media positioned in an overall multilayered media composite either: (a) upstream from the microfiber material; (b) downstream from the microfiber material; or (c) between layers of microfiber material.

A variety of advantageous constructions can be created through utilization of the electrostatically charged media. For example, electrostatically charged media provides for relatively high initial efficiencies in many applications. problem with such media, however, is that it tends to lose efficiency for an extended period of time, relative to its initial efficiency. Electrostatically charged media can be used upstream from microfiber media according to the present invention, in order to provide for some enhanced initial efficiencies. Preferred media for such applications would typically be electrostatically charged media such as E30, a charged fiber material available from ALL FELT of Genoa, Ill. 60135. It has: a basis weight of 30 g/m$^2$; a thickness of 0.024 inches (at 0.5 psi); a permeability (fpm) of 600$^+$; and, a LEFS efficiency of 43%. Typically, what would be preferred would be a media which in the absence of the applied electrostatic charge, has an LEFS efficiency, as defined herein, of no greater than 80% and typically 10% to 50% (more typically 20%–50%).

It is also foreseen that in some instances it may be desired to electrostatically charge portions of the coarse-fine fiber composition, including the microfibers themselves.

In some applications, rather than applying extra layers of electrostatically charged material to the overall construction, it may be desired to provide one or more of the "support" or "spacing" structures within the arrangement, on which the microfibers are applied, with an electrostatic charge. That is, the microfibers could be applied directly to an electrostatically charged substrate; or, a charge could be applied to the substrate after the microfibers are applied thereto.

In general, it is foreseen that a variety of methods of applying electrostatic charges to media can be utilized, including conventional ones, in the approaches as defined in this section. In some instances, commercial materials can be employed.

3. The Use of Media Containing Chemical Adsorbent/Absorbent.

Herein the term "adsorbent" will be used to refer to both absorbent and adsorbent materials. That is, the specific nature of the interaction between the captured chemical material, typically organics, and the filter material, is not referenced.

A variety of materials have been used as chemical adsorbents. For example, activated carbon or charcoal media is used to adsorb odors and various other organics.

Fibrous media has been developed which includes therein chemical adsorbents, such as carbon particles. One such material is AQF™ adsorptive media available from Hoechst Celanese Corp., Charlotte, N.C., 28232-6085. It is available in a variety of permeabilities (typically, 137–279 ft/min), thickness (0.0661 in–0.0882 in); basis weights (280–382 lb/3000 ft$^2$); MD stiffness (2220–4830 mg); and MD Tensile (17–30 lb/in). A preferred one for the applications described herein is AQF-375C which has the following characteristics:

Basis Weight—480 g/m$^2$
High performance activated carbon—spherical
Carbon content—375 g/m$^2$
Carbon Dust migration—None
Caliper—1.45 mm
Tensile strength—30 lbs/inch
Air permeability—160 ft$^3$/ft$^2$/min.
Pressure drop @ 300 cfm/ft$^2$, flat 1.2 inch
Dynamic Adsorption @ 100 cfm airflow, for a 10×10× 1.5" filter with 0.63 m$^2$ pleated media:
80 ppm n-Butane adsorption capacity—6.0 g
Break-through @ 5 min.—40%
80 ppm Toluene Gas adsorption capacity—55 g
Break-through @ 5 min.—7%
30 ppm $SO_2$ Gas ads. capacity—9.2 g
Break-through @ 5 min.—21%

| | |
|---|---|
| Particulate Removal Efficiency for AC fine dust @ 313 ft/min. Filter face velocity (aerodynamic particle size) | 0% @ 0.4 um 10% @ 1 um 70% @ 3 um |

Dust Loading @ 50% ΔP rise—6 g (10×10×15" filter)

Such media can be utilized in overall arrangements according to the present invention, to advantage. The media could be used, for example, as the support to which the microfibers are applied. Alternatively, such material can be utilized as a region of media either upstream or downstream from the region of microfiber media (with its support) to create an overall composite of advantageous properties.

4. Issues Relating to Thickness of Pleated Media; Treatments.

In general, with certain conventional, for example rotary-type, pleating equipment, the maximum thickness of media that can be readily pleated is about 0.060 inches, and typically substantially thinner (0.040 inches, often 0.030 inches or less) medias are preferred, for pleated systems. Thus, a factor of substantial consideration with respect to the development of pleated media, is the overall thickness involved.

In general, oil treatment of a media such as a cellulose media extends life. This may in part be due to the fact that as oil treated media collects carbonaceous particulates, rather than building dendrites and blocking air flow, the carbonaceous particulates become suspended in the oil. Arrangements involving oil treated media are described, for example, in U.S. Pat. No. 5,238,474, incorporated herein by reference.

In general, mass flow sensors, downstream from air filtration equipment, are finding increasing use. For example, in the automotive and truck industries, mass flow sensors are sometimes positioned downstream from the air cleaner. When media used in the air cleaner involves treatment such as oil treatment, the oil treatment itself contributes to the mass flow leaving the air cleaner or it may contribute to fouling of the equipment. Also, once oil treated, the media may have a tendency to pass more of certain fines, extending filter life due to lower efficiency.

In many instances, media including fine fiber layers as described herein, can be used to advantage in place of the oil treated media. Some examples of this are described hereinbelow.

However, it must again, generally be remembered that, typically, in order to comprise a desirable media for pleating, the overall thickness of the media should be 0.060 inches (0.15 cm) or less, preferably 0.030 inches (0.076 cm) or less. To accomplish this it may be desirable to limit the number of layers of fine fiber; and, to reduce as far as reasonably possible, the thickness of the spacing layer(s). Preferred spacing fibers for this will be no more than about 0.003 inch (0.0076 cm) thick, most preferably no more than about 0.0015 inch (0.0038 cm) thick.

5. Issues Relating to Face Velocity and Gradient v. Non-Gradient Systems.

As some of the examples discussed hereinbelow indicate, with a stacking or region of fine fiber layers having overall equal percent efficiencies, it can be shown under certain test conditions that a gradient among the layers of fine fiber can be preferred to the utilization of fine fiber layers of equal efficiency. That is, if overall equal composite efficiencies are involved, generally a gradient in the individual fine fiber layers making up the composite, from lower efficiency to higher efficiency within the composite (from upstream to downstream) can be preferred.

One can speculate on whether such an observation would be expected to hold over a wide range of face velocities. More specifically, as face velocity is substantially increased, it can be speculated that particle dendrite formation on upstream layers will occur at a lower rate since higher face velocity will generally involve greater penetration, with impaction of dust particles on forming dendrites causing destruction of the dendrites (or inhibition of dendrite buildup). Thus, one can expect that to a certain extent, application under higher face velocities will tend to negate the advantages associated with using a gradient strata as opposed to a non-gradient strata, within the fine fiber composite.

6. Some Possible Constructions.

a. Improvement to Pleated Sheet Constructions.

Pleated media (from sheets) is used in a wide variety of filter constructions. Commonly used media include: cellulose, glass fiber, or synthetic polymer fiber sheets; expanded polytetrafluoroethylene (PTFE) sheets; and sheets of fiber blends. Improved composites, wherein multilayer fine fiber arrangements according to the present invention are applied in conjunction with such media, are feasible.

It is noted that typical expanded polytetrafluorethylene sheets used as filter media have a fibril size of 0.1–0.3 microns, a permeability (fpm) of 2–70; a LFFS efficiency of >80%, typically >90% (typically a DOP efficiency of 80%–99.9999%).

Herein, the term "Multiple Fine Fiber Layer Construction or region" or "MFFL Construction or region" will be used to refer to a construction of fine fiber according to the present invention. It will generally comprise a plurality (i.e. at least two) of fine fiber layers separated by a spacing layer or matrix arrangement. As indicated by the principles described herein, the utilization of fine fiber layers (of the same or various LEFS efficiencies), can be used to provide an overall preferred MFFL construction of a preferred efficiency.

Consider a conventional cellulose sheet having a LEFS efficiency of greater than 15%; a permeability of greater than 10 ft/min. and an overall thickness of less than 0.020 inches. This is a conventional, pleatable, media. (Of course the alternate materials discussed above could also be used.)

One can apply to (i.e stack with) the cellulose sheet (or the various other sheets described) an MFFL construction according to the present invention, in order to achieve a substantially improved pleated media. Consider, for example, applying (or positioning adjacent) to the upstream side of the cellulose sheet an MFFL construction having an overall LEFS efficiency of less than, or equal to, 60% total. This could, for example, be readily formed by using three layers of fine fiber spaced by spacing constructions or support constructions (matrices) as described herein. The most downstream layer of fine fiber could be applied directly against the cellulose sheet, if desired. An overall LEFS efficiency of about 60% could be prepared, for example, from three layers exhibiting an average LEFS efficiency of about 25%.

Preferably spacing layers of less than 0.003 inches in thickness, more preferably less than 0.0015 inches in thickness, per layer, would be used. Thus, the overall thickness would be substantially less than 0.060 inches and would be readily pleatable.

This material or region could be readily pleated into an engine filter, in place of a conventional cellulose sheet. It could be used to provide an overall filter construction with an extended life, due to the type of loading that would occur within the MFFL construction, upstream from the cellulose. In the alternative, it could be used to provide a filter element having a lifetime of about the same length as the conventional (pleated cellulose) element, but of smaller size. To an advantage, the overall air cleaner could therefor be redesigned to be smaller. In some instances it could even be moved from the exterior of a vehicle to an interior location, for example under the hood.

In the overall type of construction just described, the cellulose (or other sheet) media downstream from the MFFL construction provides for some structural integrity to the overall system. Thus, the MFFL construction can be used in instances which involve relatively low face velocities, but also in applications that involve relatively high face velocities, for example in HVAC or cabin air filter applications. Of course it can also be used with HEPA or ULPA filters.

b. Improved Filters Involving Depth Media Constructions.

In U.S. Pat. Nos. 5,082,476; 5,364,456; 5,238,474; and, 5,423,892, incorporated herein by reference, a variety of air filter constructions involving depth media, or various layers of depth media, are described. In many instances positioned downstream from a region or plurality of regions of depth media, pleated media (for example, cellulose media) is positioned. In some instances, for example certain ones of those described in U.S. Pat. No. 5,238,474, the downstream pleated media is characterized as oiled pleated media, typically cellulose media which has been treated with an oil treatment. As indicated above, one can avoid the oil treatment, to advantage, by the utilization of a combination cellulose (or other sheet)/MFFL construction according to the present invention. This can be done in some instances to save space, and in others to avoid the utilization of oil material which can have undesirable effects with respect to downstream equipment such as mass flow sensors.

Of course, MFFL constructions according to the present invention can be used in arrangements which also include oil media.

c. Arrangements for Cabin Air Filtration.

In general, cabin air filtration, i.e. filtration of cabin air for vehicles, involves two concerns: removal of odors; and, removal of particulates. Composite arrangements involving MFFL constructions according to the present invention, can be incorporated into overall systems to achieve a desired level of efficiency with respect to both, to advantage. Of course single fine fiber layer arrangements can also be used in combination with materials such as electret or carbon adsorption media.

As indicated above, for odor filtration typically chemical adsorbent filters are desirable. Such material as the activated carbon filter media, for example Hoechst Celanese AQF-375C, can be used to accomplish this. Such a media could be provided, for example, upstream from an MFFL construction, according to the present invention. The MFFL construction would be quite efficient for particulate removal in the cabin air filtration system involved.

In addition, one could combine, with the overall system, an "electret" construction. That is, media having an electrical charge applied thereto, could be used in the overall cabin air filter construction as well.

Typically, electret media has a high initial efficiency, which diminishes with loading until cake formation begins, with a tendency toward a relatively slow increase in developed pressure differential across the filter, due to its inefficiency with loading. MFFL constructions as described herein can have generally lower initial efficiencies, by comparison to electret. When the two are combined, in general, desirable attributes of each can be implemented. If an electret material is positioned upstream from a MFFL material according to the present invention, advantage can be taken of the relatively high initial efficiency of the electret material. For example, a relatively light (thin) electret material can be used, so as to provide some desirable initial efficiency, but also lower development of undesirable pressure differential. Downstream from the electret material, an MFFL construction could be used to provide for an overall desirable efficiency and long life (slow build-up of pressure differential). This combination, of course, can be used in association with a carbon loaded media, to also achieve a desirable level of odor adsorption.

A typical construction would be, for example, a composite comprising, from upstream to downstream, electret/odor adsorbent media/MFFL construction.

It is anticipated such constructions could be made of a thickness that can be readily pleated, using techniques described herein.

d. Arrangements for Engine Air Filtration.

It is foreseen that techniques according to the present invention can be utilized to provide substantial improvement in engine intake air filtration systems. Such systems, for example, are used in a wide variety of internal combustion engines. They are for example used for vehicles such as automobiles, light trucks, delivery trucks, heavy duty over-the-highway trucks, construction equipment, agricultural equipment, busses, dump trucks, garbage trucks and in air filtration systems for various other equipment. For example, the techniques can be used for air intake systems for engines generally ranging in size from about 100 hp on up to about 3000 hp.

With such systems, media, especially pleated media, involving systems as described herein, can be used to provide significant advantage with respect to either efficiency or lifetime, or both, if selected. In general, overall composites having efficiencies up to about 99% or more, based upon individual fine fiber layers having efficiencies of 10% up to 90%, and typically 10% up to 70%, can be achieved. The media can then be pleated with other media such as pleated paper or pleated synthetic media, to provide a desirable overall composite. Indeed in some systems depth media constructions upstream or downstream from the fine fiber arrangement can also be applied. Various approaches to this were described earlier.

e. Application to Media Used in Zee Filter Constructions.

A variety of arrangements generally referred to as "zee filter" or "Z-filter" construction are known. For example, see U.S. Pat. Nos. 1,729,135; 2,599,604; 3,025,963; 4,589,983; 2,552,615; 2,558,185; 5,322,537; 3,112,184; 4,439,321; 4,310,419; 4,713,097; 5,512,075; and 4,039,457; and commonly assigned, copending U.S. application Ser. Nos. 08/639,371 filed Apr. 26, 1996; 08/638,453 filed Apr. 26, 1996; 08/638,703 filed Apr. 26, 1996; 08/639,220 filed Apr. 26, 1996; 08/638,421 filed Apr. 26, 1996; and 08/639,154 filed Apr. 26, 1996. The aforementioned 19 references are incorporated herein by reference. It is foreseen that fine fiber constructions as described herein can be applied to such media. That is, such constructions, which are generally formed from corrugated sheets of media such as cellulose or synthetic media, can be improved by application thereto (typically on an upstream side) of spaced fine fiber layers (or MFFL constructions) according to the present invention. The overall composite could be provided with more desirable efficiency/loading characteristics. It is foreseen that such arrangements may, for example, find use in such systems as gas turbine systems, engine intake air filtration systems and related air filter applications.

EXPERIMENTAL

In order to evaluate media according to the present invention, a variety of experiments were conducted. From the experiments, certain advantages from the use of media according to the present invention will be apparent.

Media Used in the Experiments

For the experiments, a variety of media were utilized. For comparative purposes in one of the experiments, a 35% LEFS cellulose wet laid media was used. The term "35% LEFS" in this context means that the efficiency of the media for trapping 0.78 micron particles under the characterization technique for efficiency described, is 35%.

In some of the experiments, a media wherein the microfibers comprise glass fibers was used. In those instances the media comprised a layer of glass microfibers on a porous polyester scrim (Reemay 2011). In general the glass microfibers were of various diameters between about 0.1 and 3.0 microns in diameter. The coarse scrim or fiber matrix generally comprised the polyester scrim described above, commercially available under the designation Reemay 2011. The general technique for preparation of the various glass fiber samples was described above with respect to U.S. Pat.

No. 5,336,286. The glass fiber media or composite is generally characterized with respect to % LEFS, with the percent indicating efficiency for trapping 0.78 micron particles according to the techniques described herein.

Some of the samples described herein are referred to as "Ultra-Web® type" media or DCI polymeric fiber material. These media generally comprise the coarse polyester scrim (Reemay 2011) having applied thereto microfibers of the type used in the Donaldson Company Ultra-Web® surface loading media applications. The microfibers are generally of a size about 0.1–0.5 microns, and generally comprise a polymer. The media or composite is typically characterized with respect to % LEFS, the term having the same meaning as in other applications described above.

Unless stated otherwise, in all experiments the coarse substrate was Reemay 2011, and the composites were laminated using 3M Super 77 spray adhesive, available from 3M Co., St. Paul, Minn.

Experiment 1

Tobacco Smoke Loading

This experiment evaluates use of a high efficiency media using a relatively open pore and fiber structure according to the present invention, to improve loading (life) relative to a filter media made of the same fine fibers and of approximately the same initial efficiency but of a smaller interfiber spacing. Tobacco smoke was used for several reasons. First, it tends to plug conventional high efficiency filters, with small pores, quickly. The tar in the smoke is an amorphous solid that flows and is subjected to large capillary forces from the small fibers. The capillary forces cause the tobacco smoke residue to coat the fibers and wick into the pores. Second, it is a common contaminant encountered in vehicle cabin air, indoor air, etc.

Materials Tested:
  (a) A single layer of Ultra-Web® type fine fiber material comprising high efficiency fine polymeric submicron fibers on a substrate of Hovolin 7311. Hovolin 7311 is a former Hollingsworth & Vose substrate comprising polyester fibers.
  (b) A single layer of "medium" efficiency (68.6% LEFS) fine Ultra-Web® fibers that have larger pores (inter fiber spaces) than the single layer of high efficiency fine polymeric fibers in item (a). The substrate material was Hovolin 7311.
  (c) A 14-layer composite of fine polymeric fibers on Reemay 2011. Composite (total initial) LEFS efficiency of 99.6%, single layer LEFS efficiency of approximately 28%. The inter fiber spacing of the fine fibers of this material was larger than either of the media described in item (a) or (b). This material was prepared by using an Ultra-Web® technique to apply fine fibers to the Reemay 2011.

Results:
1. The loading to 3 inches $H_2O$ restriction, at 6.8 fpm (2.1 meters/min), is measured in number of cigarettes consumed.
2. The area that was loaded was 81 sq.in. in each case.

| Media | Number of Cigarettes to 3.0 in H2O | Composite Initial LEFS Efficiency | Composite Final LEFS Efficiency |
|---|---|---|---|
| (a) | 3 | 99.3 | not measured |
| (b) | 16 | 68.6 | 34.1 |
| (c) | 66 | 99.6 | 97.5 |

3. The final LEFS efficiency being lower than the initial LEFS efficiency (for media (b) and (c)) is believed to be related to the nature of the contaminant. (It is noted that the effect was more pronounced for the single layer system than the multi-layer system.) Fluids which coat fibers effectively increase the wetted fibers' diameter. Also, as small pores are closed and pressure drop increases, flow and aerosols may be diverted to the larger pores which remain open longer. Relatively small particles (0.78 $\mu$) passing through large pores, or past larger wet fibers, would have a lower propensity to collect than when the media is not loaded.

Conclusion:

Comparing the differences between media (a) and (b), the tradeoffs between life and efficiency are clearly demonstrated and are typical of the kinds of choices available to one selecting media for an application. In this instance, when going from media (a) to media (b), a 5 or 6 fold increase in life was obtained at a cost of passing 45 times as much contaminant (based on initial efficiency.).

Comparing the differences between media (b) and (c), going from media (b) to media (c), a 4-fold increase in life was obtained and particle penetration in the composite was reduced by a factor of 78, as reflected by the initial efficiency increase from 68.6% to 99.6%.

Comparing the differences between media (a) and (c), a 22× increase in life was obtained and particle penetration for the composite was essentially unchanged.

For a selected level of efficiency, life can be improved significantly by using large fibers to space layers of fine fibers relatively far apart. With the present invention, it is possible in some systems to improve both life and efficiency, or at least to improve one without undesirably compromising the other, whereas life is typically traded for efficiency using conventional media.

Experiment 2

DOP Efficiency and Loading

These tests were conducted to evaluate a high efficiency media using a relatively open pore fiber structure to improve loading (life) relative to a filter media made of the same fine fibers and of approximately the same initial efficiency but of a smaller interfiber spacing. Alternatively stated, the study was to evaluate whether filter life improvements can be made by reducing the single layer (component) efficiency while maintaining equal composite efficiency. DOP is an oil, not an amorphous solid like the tar contained in cigarette smoke, and acts much like the tar in Experiment 1 with regard to closing pores, wicking, and coating fine fibers. However, the test apparatus used for this experiment measured real time efficiency and pressure drop.

Set Up:
  Ref: MIL STD 282, ASTM D 2986

Materials Tested:
  (a) A single layer of high efficiency fine polymeric submicron fibers on a substrate of H&V 7311, with a combined LEFS efficiency of 99%.
  (b) An 8-layer composite of: 7 layers of fine polymeric fibers on Reemay 2011; and, a cover layer of Reemay 2011. The fine fibers were of the type generated by Donaldson's Ultra-Web® processing. The composite (total) initial LEFS efficiency was 97.5%, with a single layer (Reemay 2011 with fine fiber) LEFS efficiency of 41%. The inter fiber spacing of the fine fibers of this material was observed to be larger than that of the media described in item (a).
  (c) A 14-layer composite of fine polymeric fibers (Ultra-Web type fibers) on Reemay 2011. The composite had a total initial LEFS efficiency of 99%, and a single layer (Reemay 2011 with fine fibers) LEFS efficiency of 28%. The inter fiber spacing of the fine fibers of this material was designed to be larger than either of the media described in item (a) or (b).

Results:

The media of (b) and (c) showed significant loading advantages over the media made from relatively closely spaced fine polymer fibers (i.e. media (a)).

| Media Description | Composite LEFS Efficiency (%) | Final dP After 100 mg DOP (in H$_2$O) | Initial dP (in H$_2$O) | dP Rise (in H$_2$O) | Single Layer LEFS Efficiency (%) |
|---|---|---|---|---|---|
| 1-layer fine polymeric fiber | 99% | 1.95 | 0.40 | 1.55 | 99% |
| 8-layer fine polymeric fiber | 97.5% | 0.70 | 0.62 | 0.08 | 40% |
| 14-layer fine polymeric fiber | 99.0% | 0.70 | 0.58 | 0.12 | 28% |

The loss in efficiency with time is consistently observed with all of the samples of this test, and is analogous to the reduction in LEFS efficiencies reported in the tobacco loading experiment (Experiment 1). The reason for the reduction in efficiency is believed to be caused by the same phenomenon experienced in the tobacco smoke tests, which were explained in the conclusions to Experiment 1.

| Media Description | Composite LEFS Efficiency (%) | Initial DOP Efficiency (% absol) | Final DOP Efficiency After 100 mg DOP (% absol) | DOP Efficiency Loss (% absol) | Single Layer LEFS Efficiency (%) |
|---|---|---|---|---|---|
| 1-layer fine polymeric fiber | 99% | 72 | 62 | 16 | 99% |
| 8-layer fine polymeric fiber | 97.5% | 59 | 56 | 3 | 40% |
| 14-layer fine polymeric fiber | 99.0% | 83 | 70 | 13 | 28% |

NOTE
The multi-layer spaced, fine fiber structure experienced a pressure drop increase of 1/20th (media (b)) and 1/13th (media (c)) of the closely spaced fine fibers of media (a).

Conclusion:

DOP loading results are consistent with the tobacco smoke loading results. The sum of low efficiency layers resulting in alternating fine-coarse fiber composite structure provides substantial loading (life) benefits over a filtration media with a single fine fiber layer efficiency approximately equivalent to the combined layers of the composite.

Experiment 3

NaCl Loading

This series of tests was performed to evaluate filter life benefits that can be obtained by going from a single high efficiency layer of fine fiber media supported by a substrate to multiple low efficiency layers of fine fiber on a substrate, with approximately equal composite LEFS efficiencies. These tests are distinguished from the tobacco and DOP loading in that the salt particles fed to the media are discrete solid particles, not liquid or semi-amorphous solids, therefore caking occurs and efficiency increases with loading. It was observed that after caking occurs, the slopes of the loading curves were very similar for all of the media tested. In particular, after caking occurs, the media is no longer being tested/challenged.

One measure of filter life is time to a predetermined pressure drop; another is mass of contaminant fed to a predetermined pressure drop. If the predetermined terminal pressure drop is significantly above the restriction where cake formation begins, then cake loading comparisons are being made rather comparisons between media performance. Life comparisons here are made at a restrictions where cake formation is normally completed. In the following tables operation to 2 inches H$_2$O and inches H$_2$O are given. Samples were tested at 10 fpm.

Figure 25:
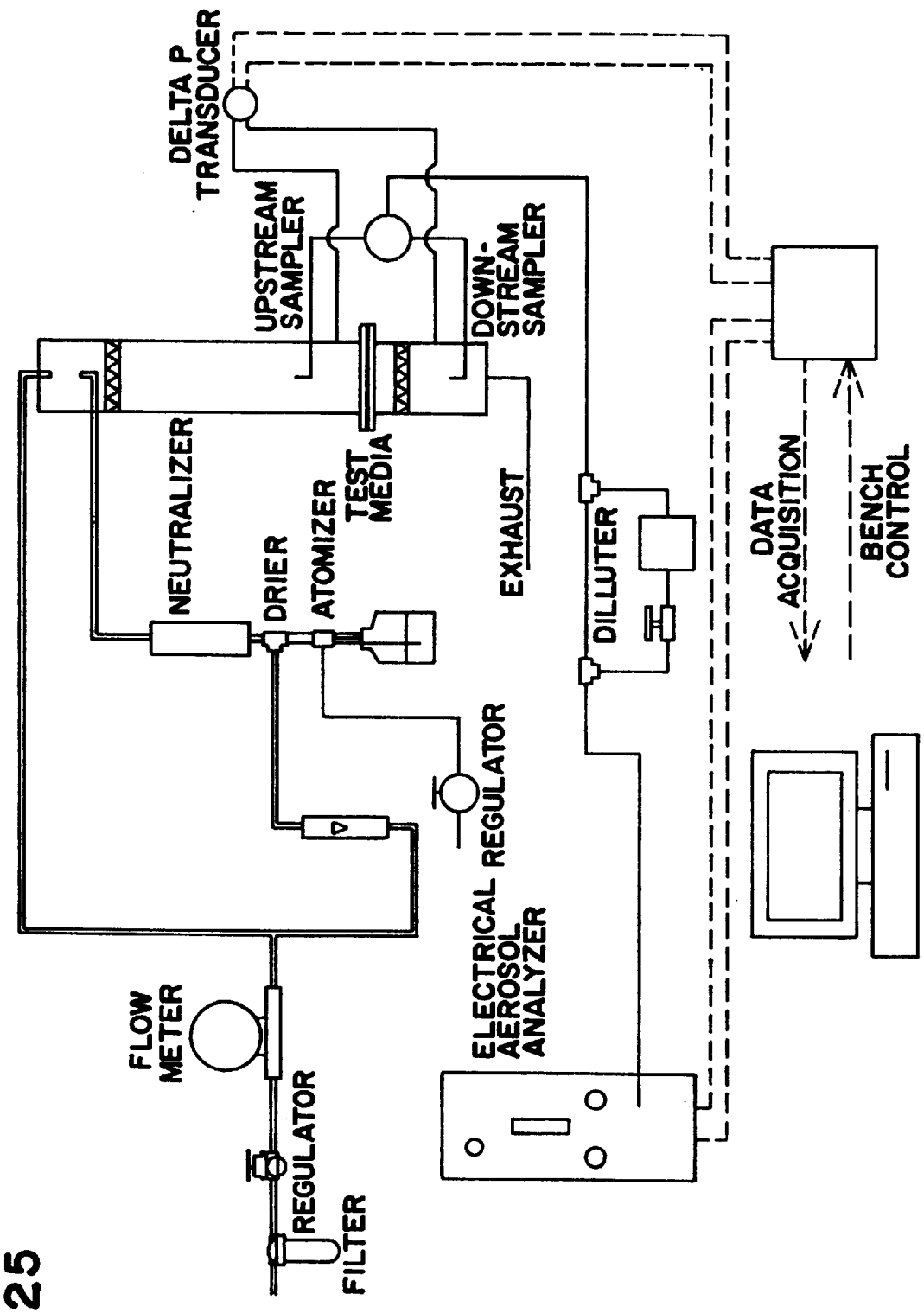
FIG. 25 is a schematic of a custom salt bench used in certain experiments.

Set Up:

Media were loaded on a custom made salt loading bench (schematic shown in FIG. 25), using commercially available components, specifically a TSI constant high output atomizer model 3076 for particle generation, a TSI model 3054 aerosol neutralizer, and a TSI Electrical Aerosol Analyzer (EAA) model 3030 used for particle counting and sizing to measure particle efficiency as test media is loaded. Submicron salt was used as the contaminant, because it is more easy to discern loading differences between various media when this contaminant is used, than when traditional SAE silica dust is used.

Materials Tested:

Media with composite LEFS efficiencies of 40 to 45%, 60 to 65%, and 75 to 80%. All composites were made from polymeric fine fibers (Ultra-Web®-type fibers) on a Reemay 2011 substrate. For a given composite sample, all layers within that sample were made from media of equal LEFS efficiency media (i.e. there were no efficiency gradients in the composites tested in this series of experiments). For instance, if a composite had an LEFS efficiency of 50% and was made of 6 layers, each layer (Reemay 2011 substrate with fine fibers thereon) would have an LEFS efficiency of 10.9%.

Results:

Composite media with lower layer LEFS efficiency have better loading (life) than composite media comprised of a fewer layers with a higher layer LEFS efficiency. This apparent ability to choose both efficiency and life, independently, differs from many applications of traditional media. With many practices using conventional media, life is gained by sacrificing efficiency.

| 40–45% Composite LEFS Efficiency | | | |
|---|---|---|---|
| Number of Layers | Single Layer LEFS Efficiency | Time to 5 in H$_2$O (min) | Life Relative to Reference Media (min/min) |
| 1 (Ref Media) | 41% | 230 | 100% |
| 2 | 21 | 280 | 122% |
| 3 | 16 | 350 | 152% |
| 4 | 12 | 630 | 273% |
| 5 | 10 | 680 | 295% |

| 40–45% Composite LEFS Efficiency | | | |
|---|---|---|---|
| Number of Layers | Single Layer LEFS Efficiency | Time to 2.0 in H$_2$O (min) | Life Relative to Reference Media (min/min) |
| 1 (Ref Media) | 41% | 110 | 100% |
| 2 | 21 | 170 | 154% |
| 3 | 16 | 250 | 227% |

-continued

| | | | |
|---|---|---|---|
| 4 | 12 | 475 | 432% |
| 5 | 10 | 525 | 477% |

60–65% Composite LEFS Efficiency

| Number of Layers | Single Layer LEFS Efficiency | Time to 5 in H$_2$O (min) | Life Relative to Reference Media (min/min) |
|---|---|---|---|
| 2[1] (Ref Media) | 41% (each layer) | 165 | 100% |
| 3 | 28 | 230 | 139% |
| 4 | 21 | 290 | 176% |
| 5 | 18 | 305 | 185% |
| 7 | 13 | 510 | 309% |
| 9 | 10 | 660 | 400% |

60–65% Composite LEFS Efficiency

| Number of Layers | Single Layer LEFS Efficiency | Time to 2.0 in H$_2$O (min) | Life Relative to Reference Media (min/min) |
|---|---|---|---|
| 2 (Ref Media) | 41% (each layer) | 85 | 100% |
| 3 | 28 | 125 | 147% |
| 4 | 21 | 175 | 205% |
| 5 | 18 | 210 | 250% |
| 7 | 13 | 375 | 440% |
| 9 | 10 | 540 | 635% |

70–80% Composite LEFS Efficiency

| Number of Layers | Single Layer LEFS Efficiency | Time to 5 in H$_2$O (min) | Life Relative to Reference Media (min/min) |
|---|---|---|---|
| 3 (Ref Media) | 40% | 170 | 100% |
| 4 | 28% | 230 | 135% |
| 6 | 20% | 260 | 150% |
| 7 | 18% | 340 | 200% |
| 8 | 16% | 410 | 240% |
| 9 | 13% | 540 | 320% |

70–80% Composite LEFS Efficiency

| Number of Layers | Single Layer LEFS Efficiency | Time to 20 in H$_2$O (min) | Life Relative to Reference Media (min/min) |
|---|---|---|---|
| 3[2] (Ref Media) | 40% (each layer) | 80 | 100% |
| 4 | 30% | 125 | 156% |
| 6 | 20% | 170 | 213% |
| 7 | 18% | 230 | 287% |
| 8 | 16% | 280 | 350% |
| 9 | 13% | 400 | 500% |

[1]For this sample (and other samples where the reference layer is identified as having two layers) a two-layer composite was used as the reference media, because a single layer of 60–65% LEFS was not conveniently available. Since the composite comprised two layers, each of which was 41% efficient, the overall efficiency was 1-[(1-.41) × (1-.41) or 65%.
[2]Here, a three-layer system was used as the reference. It had an overall composite efficiency of 78%. [1-(1-.40)$^3$]

Conclusion

From the results of this experiment, it is clear that is it possible to choose both a medium's efficiency and loading (life) independently, whereas for typical conventional media and a selected initial LEFS efficiency, the corresponding range of salt loading life values might be limited to a range of less than 2:1. This experiment has demonstrated the ability to increase sub micron salt loading life by a factor of 5 or 6, through providing increased spacing between fine fibers, by lowering the average layer efficiency and increasing the number of layers.

Experiment 4

Salt Loading at 150 fpm

Set Up

Sample Area: 25 square inches (flat square sheet) using a custom test bench (schematic 14) and custom Collison atomizers, TSI 3054 neutralizer Materials Tested 1. Conventional wet-laid cellulose used in engine air filtration with an initial LEFS efficiency of 35–38%. Typically operates between 8 and 10 fpm face velocity.
2. A 3-layer composite made from wet-laid hand sheets of glass microfibers that range in size from submicron to about 3 micron on Reemay 2011. overall composite LEFS efficiency 32% single layer efficiency 12% (each) The glass fibers used were Schuller #106.

Results

| Media | Thickness (inch) | Initial LEFS Efficiency (%) | Initial Dp at 150 fpm (in H$_2$O) | dP Rise (in H$_2$O) | Time at 150 fpm to dP Rise (minutes) |
|---|---|---|---|---|---|
| Cellulose surface loading media | .013–.015 | 35–38% | 6.8 | 5.8 | 13 |
| 3-Layer composite (glass fibers; no gradient) | .026–.028 | 32% | 0.5 | 3.5 | 75 |

Conclusion

A 3-layer pleatable composite media, including scrim having a web made from fine glass fibers (submicron -3 microns in diameter), demonstrated a significantly greater permeability (13×) and submicron salt loading life (>5×) than a pleatable cellulose surface loading media of approximately equal initial LEFS efficiency. The test velocity of 150 fpm was arbitrary and intended to illustrate a capability of the media. This is not meant to suggest that engine air cellulose media normally operates at 150 fpm face velocity.

Experiment 5

Non-Gradient vs Gradient Embodiment

This experiment was intended to compare the loading results of a gradient embodiment of the invention with an initial LEFS efficiency of about 65% to that of a non-gradient media of equal number of layers and equal LEFS efficiency.

Set Up

Same as salt loading for Experiment 3 above.

Materials Tested

1. The non-gradient media was made from submicron polymeric fiber (Ultra-Web®-type fiber) deposited onto Reemay 2011 and laminated by hand using 3M Super 77, each layer having an approximately equal LEFS efficiency to the other two layers in the composite. The single layer LEFS efficiency was about 24%.
2. The gradient media was made from submicron polymeric fibers (Ultra-Web®-type fibers) deposited onto Reemay 2011 with succeeding layers having greater LEFS efficiency than the preceding layers. The gradient chosen was arbitrary, and it is not known if additional life benefits would have been gained with a different selection of layers for the 3 layer gradient composite, at the same overall LEFS efficiency. In this instance, from upstream to downstream, the LEFS efficiencies of the layers were about 10%, 20%, and 40%. These too were hand laminated using 3M Super 77.

Results

Figure 22:
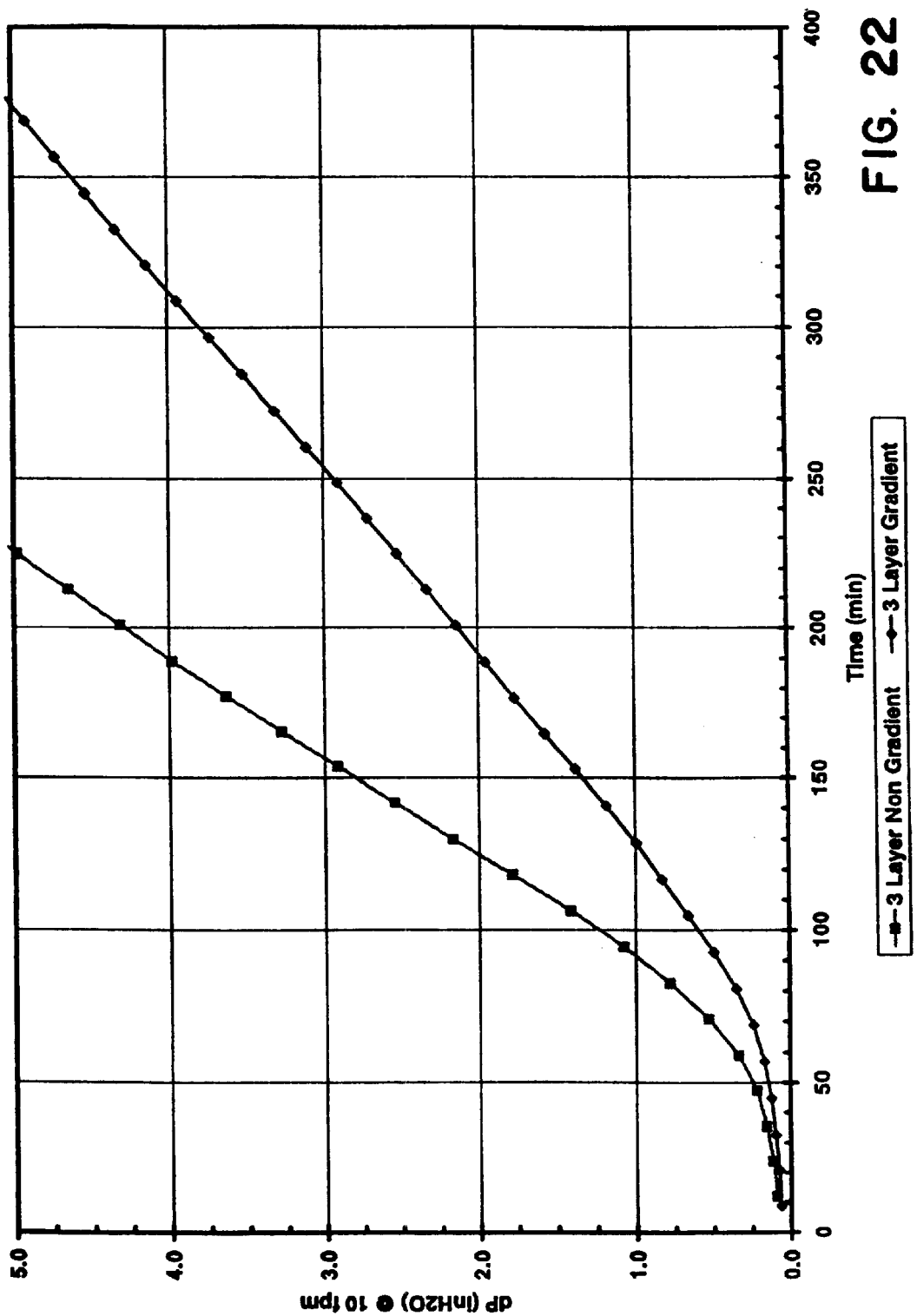
FIG. 22 is a plot of data from Experiment 5.

The results are as shown in FIG. 22.

Observations and Conclusion

The gradient version of the invention better utilized the available media volume than a non-gradient equivalent (thickness, perm, and LEFS efficiency). This is demonstrated by a 66% increase in submicron particle (NaCl) loading of the gradient sample relative to the non-gradient. This again can be explained in terms of the interfiber spacing of the fine fibers. A non-gradient media structure of the same volume and efficiency as a gradient media is more likely to not utilize the loading potential of the fibers towards the downstream side of the media due to cake formation on the upstream side of the non-gradient media. A cake forms sooner on the non-gradient media than the gradient material. This is due to the average distance between fine fibers being smaller for the non-gradient media than that of the lower efficiency upstream layers of the gradient media. Using LEFS efficiency as an index for fiber spacing, the first layer of the nongradient arrangement has a 24% LEFS efficiency, whereas the gradient structure's first layer is 10% efficient. Therefore, a gradient media structure will tend to more effectively utilize all of the available media volume than a non-gradient equivalent.

Experiment 6

Comparison Between Glass and Polymeric Submicron Fibers

This test compares the gradient media tested in Experiment 5 which used a submicron polymeric (Ultra-Web®-type) fine fiber, with a glass fiber system. The polymeric fibers were about 0.4 $\mu$ with a relatively small fiber size variance. The glass fibers were about 0.2 to 3.0 $\mu$, Schuller fiber 106. Single layer media of 40% LEFS efficiency were also tested in the glass and polymeric versions.

Set Up See 10 fpm salt loading Experiment 3.

Materials Tested

1. Polymeric fine fiber gradient media from Experiment 5.
2. A submicron glass fiber gradient version of the gradient media tested in Experiment 5. The submicron glass fibers were selected to match the median size as the polymeric fiber but having a different distribution about the mean. Wet-laid handsheets were prepared using a standard 8×8 inch handsheet former. The glass fibers were placed onto the Reemay 2011 which was supported by a fine plastic mesh which normally collects fibers drained from the slurry.
3. Single layer of fine fiber polymeric media with a 40% LEFS efficiency.
4. Single layer of fine fiber glass (Schuller #106) media with a 40% LEFS efficiency.

Results

The difference in loading for the gradients was about 5% at 5.0 in $H_2O$, and the loading of single layer 40% LEFS samples differed by about 10%. The rate at which the media seasoned were very similar for the single layer media. For the gradient media, the glass fiber sample increased in efficiency faster than the polymeric fiber version. The reason for this was partially understood at a later point in time when it was discovered that glass fibers of up to about 3 $\mu$ were included in the glass fiber stock used to make handsheet samples. This was discovered when SEMS were taken for pore size analysis. The results of this experiment are plotted in FIGS. 23 and 23 A.

Figure 23:
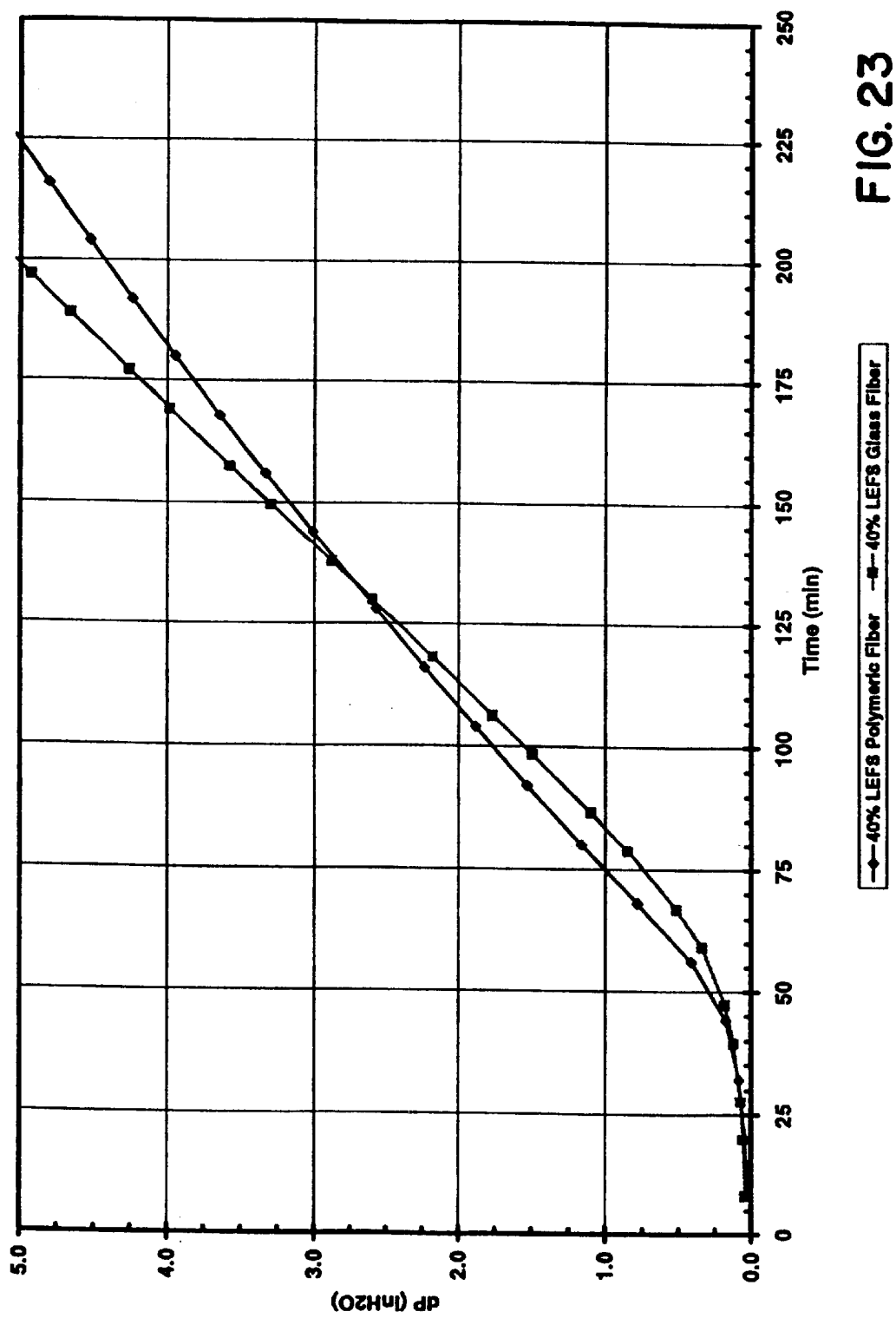
FIG. 23 is a plot of certain data from Experiment 6.
Figure 23:
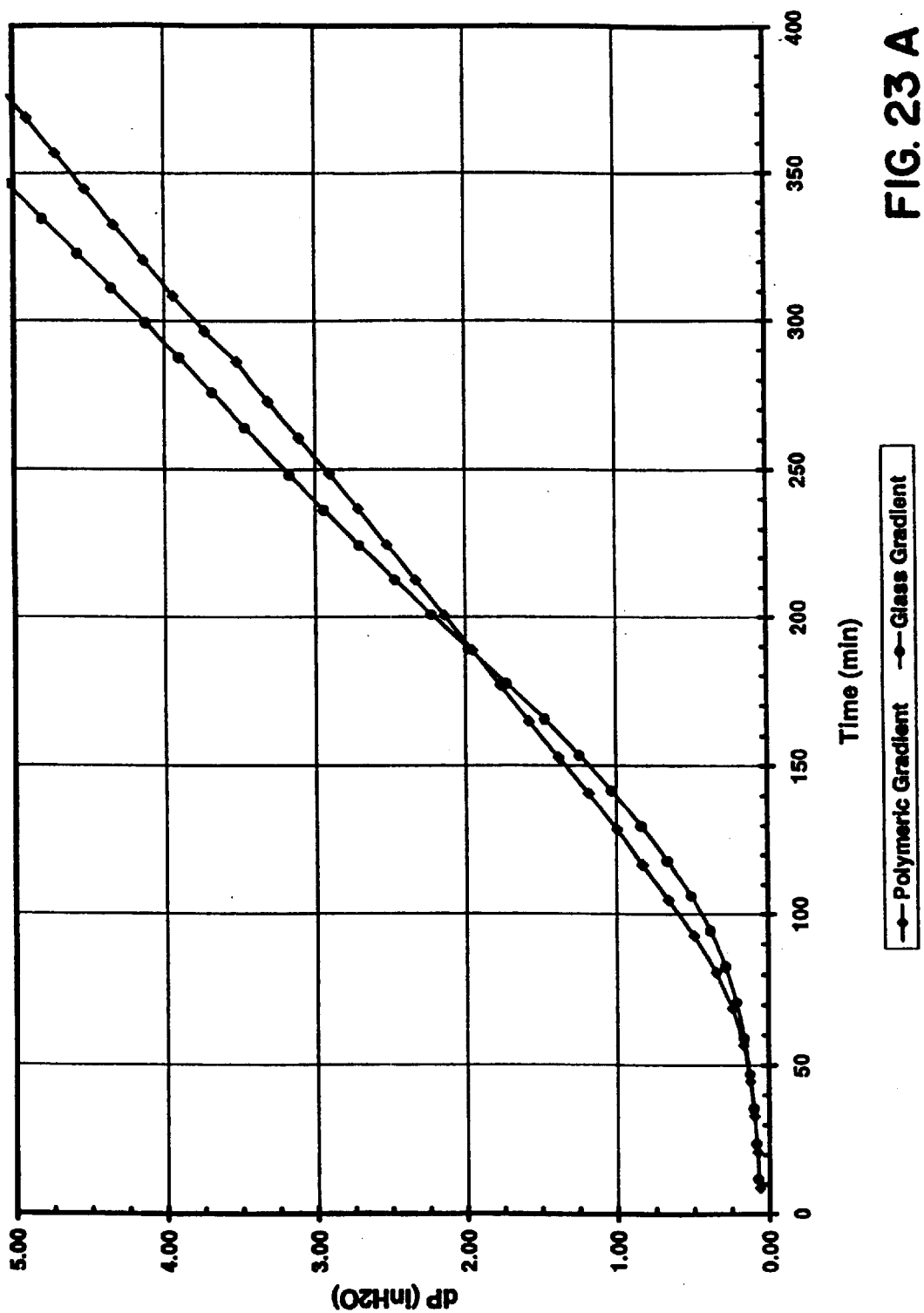

In FIG. 23, the plot compares the performance of the single layer polymeric fiber version (40% LEFS) with the single layer glass fiber version (40% LEFS).

In FIG. 23 A, the plot compares the performance of the 3-layer gradient polymeric version (60% LEFS) to the 3-layer gradient glass fiber version (60% LEFS). Note also that for each type (polymer or glass) the media in the form of a gradient system had about 70% more life and about a 33% reduction in penetration. This indicates that efficiency does not have to be sacrificed to gain life, when preferred techniques of the present invention are used.

Conclusion

Gradient forms of the media tend to load better than non-gradient systems.

Before cake formation, glass and polymeric fibers perform very similarly, though the glass fibers included a broader fiber size distribution than the polymeric fibers. Given the disparity in fiber size and distribution, this was unexpected. The difference in slope of the loading curve after cake formation is not presently understood.

Experiment 7

Observations of Various Samples.

FIGS. 12–21 are scanning electron micrographs (SEMs) of various media. The principles according to the present invention can be understood by reviewing the various media depicted.

Figure 12:
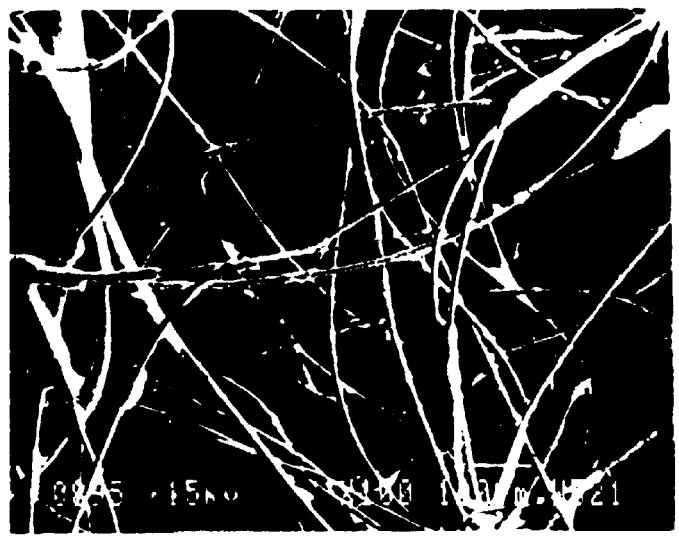
FIG. 12 is a scanning electron micrograph of a conventional air-laid polymeric fiber media.

Attention is first directed to FIG. 12. FIG. 12 is a scanning electron micrograph, 100× magnification, which shows a conventional air laid polymeric fiber media, in particular Kem Wove 8643. Consistency of fiber size is observable. This is a 1.5 denier material. Its LEFS efficiency is 3%. Its thickness is about 0.30 inches. It has a basis weight of about 73 lb/3000 $ft^2$, a volume solidity of 1.1% and a permeability of 400 fpm.

Figure 13:
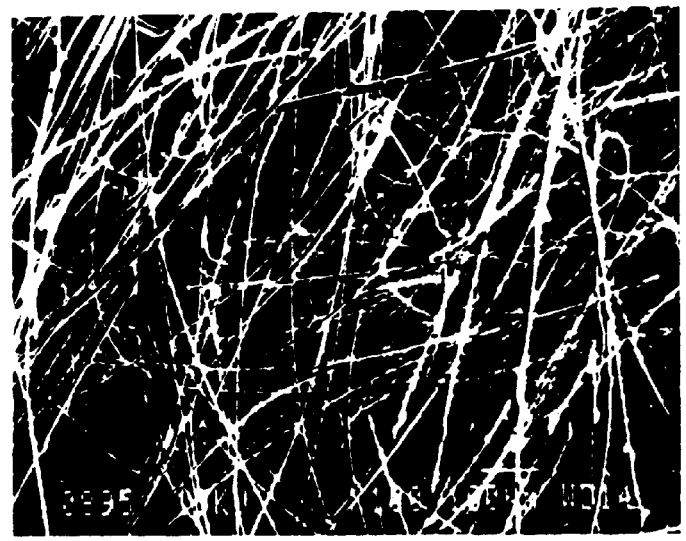
FIG. 13 is a scanning electron micrograph of a conventional air-laid glass fiber media.

FIG. 13 is a convention air laid glass fiber media, at 100× magnification. The particular media is AF18, available from Schuller. Again, consistency of fiber size is viewable. It has an LEFS efficiency of 12%; a thickness of 0.18 inches; a basis weight of 60 lb/3000 $ft^2$; a volume solidity of 0.9%; and a permeability of 230 fpm. The material has a 45% ASHRAE rating and an approximate fiber size of 4.5 $\mu$.

Figure 14:
FIG. 14 is a scanning electron micrograph of a conventional two-phase media.
Figure 15:
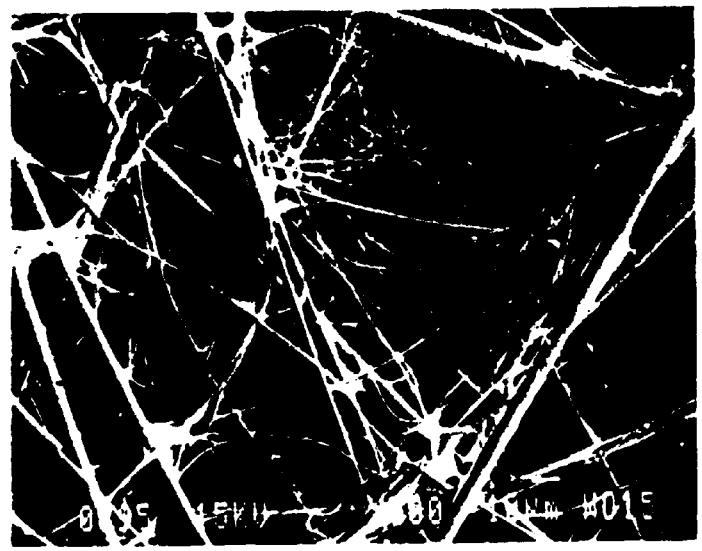
FIG. 15 is a scanning electron micrograph of the same conventional two-phase wet-laid glass media as shown in FIG. 14.

FIGS. 14 and 15 depict a conventional two-phase media, at 500-fold magnification. Both phases are glass fibers. The media of the two photographs is Hollingsworth & Vose HF343. FIG. 14 is of the upstream side, where the more coarse fibers are located. FIG. 15 is of the downstream side, and a mixture of the finer fibers with the coarse is viewable. HF343 is a wet-laid glass fiber media. The upstream side of the media (phase one) has relatively open, large, coarse, self-supporting fibers intended to capture and store coarse contaminant. The downstream side (second phase) of the media is made of a combination of fine and coarse fibers. The fine fibers provide higher efficiency but lower capacity than the large fibers in phase one. The media has an ASHRAE rating of approximately 60–65%. HF343 has an LEFS efficiency of 23%; thickness of 0.02 inches; a basis weight of 50 lb/3000 $ft^2$; a volume solidity of 7.1%; and a permeability of about 135 fpm.

In general, the volume solidity of a fine fiber layer, of the present invention, is difficult to measure directly, or indirectly, and becomes more difficult for LEFS efficiencies less than about 15–20%. The primary difficulty lies in estimating the normal local thickness of the fine fiber layer. For a typical combination of fine and coarse fibers used to construct arrangements according to the present invention, the fine fibers create a open porous "surface". The topography of the surface resembles that of a spider web draped over a support structure. The surface of the microfiber matrix derives its shape from the fiber structure and voids beneath it (the support structure), consequently the matrix has many peaks, valleys, ridges and troughs. The thickness dimension used for estimating the solidity is not the dimension from a peak to a valley, but the thickness of the web/layer at a peak, at a valley, or at a local planer region. This geometry has features that are not evident in SEM photos, but are readily apparent when inspected through a stereoscope, at 10× to 40× magnification. The solidity estimates reported for the materials of the invention are derived from estimates of the local thickness normal to fine fiber layer.

Figure 16:
FIG. 16 is a scanning electron micrograph of a media according to a first embodiment of the present invention.

FIG. 16 is a composite media according to the present invention. The media comprises Schuller glass fiber 106 deposited on Reemay 2011. The fine fiber diameter range extended from submicron up to about 3 microns. The amount of fiber 106 deposited is sufficient for the resulting layer to have a percent efficiency LEFS of 40%. In the picture, the very fine fibers comprising the layer of fine fibers are readily viewable. Underneath, in some locations, the more coarse fibers can be viewed.

The material of FIG. 16 was made of a wet-laid hand sheet of the fine fiber material, deposited onto a Reemay 2011 substrate as described above in the specification. In this media, the figure that would represent the ratio of the fiber diameter of the coarse substrate fibers to the fiber diameter of the fine fibers is much greater, than in the media depicted in FIGS. 14 and 15. The fine fiber layer permeability is estimated by removing the substrate contribution from the permeability of the composite. For low efficiency-high permeability samples, it was necessary to stack multiple layers to obtain measurable values to compute average permeability.

For this material, when measured at 1000×, the average area solidity was about 52%. The permeability was about 190 fpm, the volume solidity about 10%, the basis weight 1.5 lb/3000 ft$^2$, and the thickness 10 microns.

Figure 17:
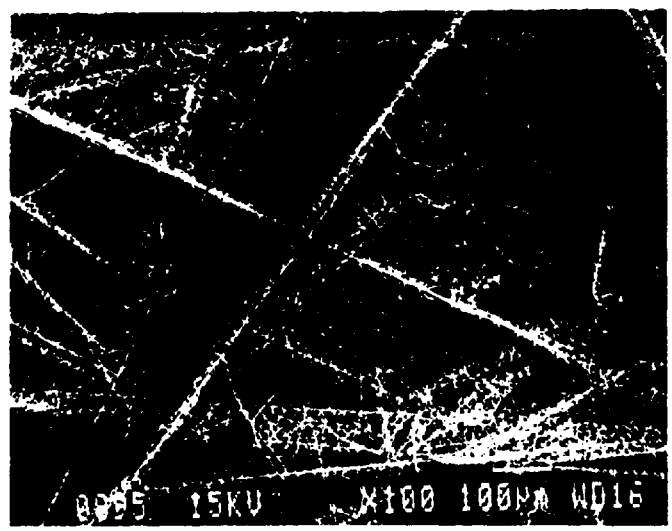
FIG. 17 is a scanning electron micrograph of a media according to a second embodiment of the present invention.

FIG. 17 is another composite media according to the present invention. The media in FIG. 17 is shown at 100× magnification. The media comprises a DCI (Donaldson Company Inc.) polymeric fine fiber positioned on a coarse substrate comprising Reemay 2011. The DCI polymeric fine fiber was made generally according to the same process used to form fine polymeric fibers for Donaldson's Ultra-Web® products, a trade secret process. The fine fiber diameter was submicron.

Figure 18:
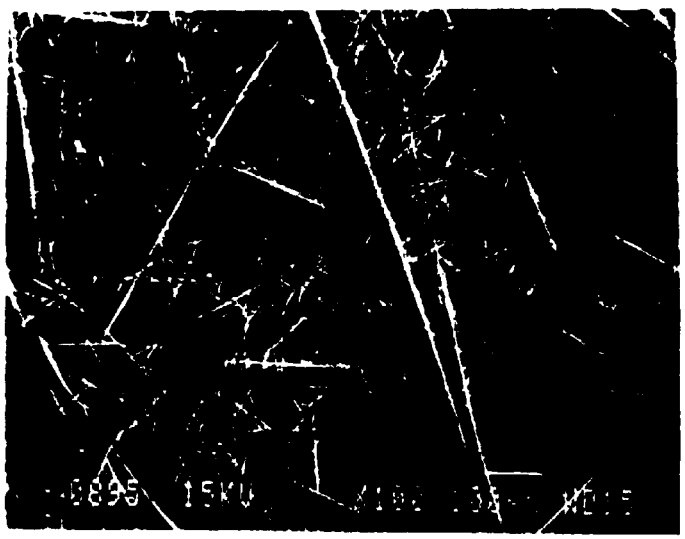
FIG. 18 is a scanning electron micrograph of a media according to a third embodiment of the present invention.

FIG. 18 is another composite media according to the present invention. In FIG. 18, the media is shown at 100-fold magnification. The media comprises Schuller glass fiber 106 deposited on Reemay 2011. The amount of glass fiber present was sufficient to provide an efficiency (% LEFS) of 12%. The basis weight of the fine fiber layer was about 0.5 lb/3000 ft$^2$, and the permeability was about 600 fpm. In the micrograph, both the coarse fibers and the fine fibers are readily discernible. This material had an average area solidity of about 33% when evaluated at 1000× magnification.

Figure 19:
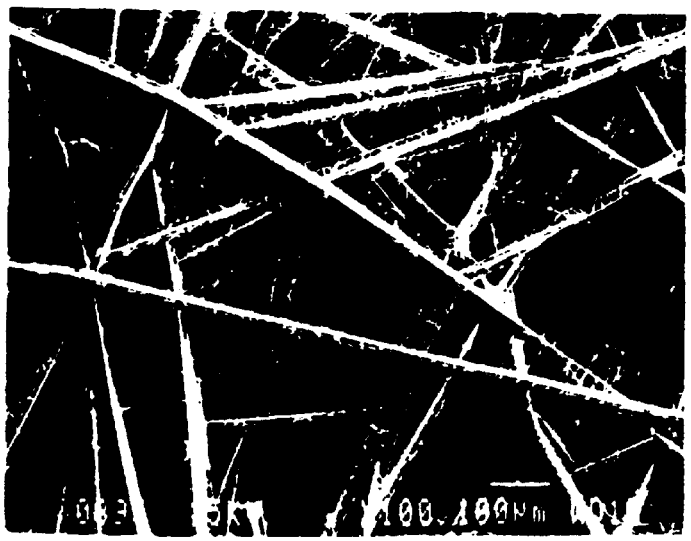
FIG. 19 is a scanning electron micrograph of a media according to a fourth embodiment of the present invention.

FIG. 19 is another composite media according to the present invention. It comprises DCI polymeric fine fiber deposited on Reemay 2011, depicted at 100-fold magnification. The media depicted had a percent efficiency of 12% LEFS. Again, the web of fine fibers is readily discernible positioned on top of the underlying coarse fiber support. When evaluated at 500× magnification, this material was observed to have an average area solidity of 22%.

FIG. 20 is a micrograph of the material shown in FIG. 19, depicted at 500× magnification. The very fine fiber web, on top of the underlying coarse fiber support, is readily discernible.

FIG. 21 is a 1000× magnification of the material shown in FIG. 19, after NaCl loading. The salt particles, trapped on the very fine fibers, are readily discernible on the picture.

Figure 24:
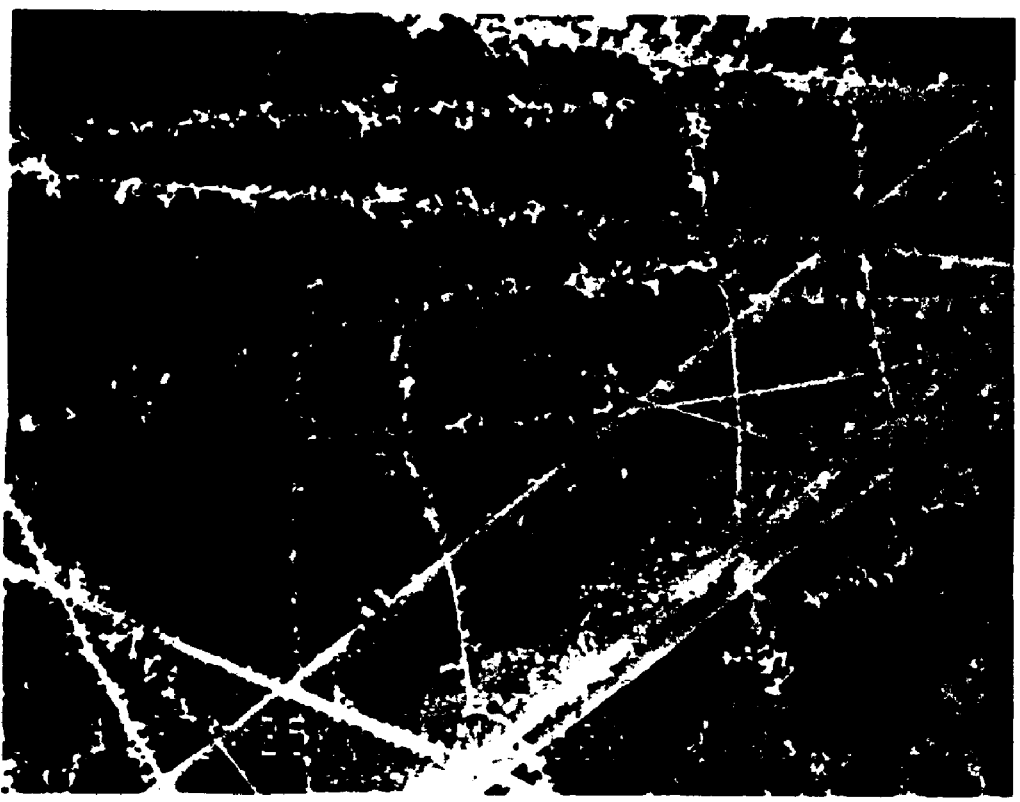
FIG. 24 is a scanning electron micrograph of a media according to the present invention shown after NaCl loading.

In FIG. 24, NaCl loaded 18% LEFS media is shown, at 1000× magnification. The NaCl particles are viewable primarily trapped on the fine fibers. The media material of FIG. 24 is DCI fine fiber polymer on a Reemay 2011 coarse substrate.

In the arrangements according to the present invention, depicted in FIGS. 16–20, the characteristic of very fine fibers being positioned on top of a coarse substrate is generally discernible. This is the case regardless of the percent efficiency, or the particular material utilized for formation of the fine fibers. In FIG. 21, operation to achieve load on the fine fiber was readily observed.

FURTHER OPTIONS

It is foreseen that in some instances arrangements according to the present invention may be utilized in an environment involving the filtering of fluid streams which contain components that are chemically incompatible with certain types of fiber materials. For example, some air streams may carry chemicals which are damaging to polymeric materials, but not damaging to glass. If such is the case, it will be preferred to construct the filtering material from materials which are resistant to damage under the intended use environment.

Further, it is foreseen that it may be desirable in some circumstances to utilize the present invention in a "scaled up" version. This would be an application in which the "fine fibers" of the composite are relatively large and the coarse fibers are even larger. That is, the ratio of size between the fine fibers and the coarse fibers would be maintained within the ranges generally stated herein, however the size and thickness of each would be substantially larger than the preferred ranges disclosed herein. For example, each diameter might be 5× to 10× larger than defined herein. Such constructions may be usable, for example, to form agglomerates within a depth media or to form a relatively efficient depth media which includes small fibers and is resistant to collapse as loading occurs in unique environments involving the filtering of rather large particles. It is not anticipated that such constructions will be preferred or desirable for most typically encountered industrial and/or engine environments.

What is claimed is:

1. A filter media for filtering fluids; said filter media including:
    (a) a first filter media arrangement comprising a multi-layer composite and including at least first, second, third and fourth layers of fine fiber material therein:
        (i) said first layer of fine fiber material:
            (A) having an average fiber diameter of no greater than 5 microns; and,
            (B) having a first efficiency, on its own, for 0.78 micron particles of no greater than 25.5%;
        (ii) said second layer of fine fiber material:
            (A) having an average fiber diameter of no greater than 5 microns; and, (B) having a second efficiency, on its own, for 0.78 micron particles of no greater than 25.5%;
(iii) said third layer of fine fiber material:
(A) having an average fiber diameter of no greater than 5 microns;
(B) having a third efficiency, on its own, for 0.78 micron particles of no greater than 54.5%; and
(C) being positioned within said multi-layer composite with the second layer of fine fiber material between the third layer of fine fiber material and the first layer of fine fiber material; and
(iv) said fourth layer of fine fiber material:
(A) having an average fiber diameter of no greater than 5 microns;
(B) having a fourth efficiency, on its own, for 0.78 micron particles; of no greater than 54.5%; and,
(C) being positioned within said multi-layer composite with the third layer of fine fiber material between the fourth layer of fine fiber material and the second layer of fine fiber material; and
(b) a first fibrous spacing layer positioned between the first and second layers of fine fiber material; the first fibrous spacing layer having an efficiency, on its own, for 0.78 micron particles, of no greater than 10%;
(c) a second fibrous spacing layer positioned between the second and third layers of fine fiber material; the second fibrous spacing layer having an efficiency, on its own, for 0.78 micron particles of no greater than 10%;
(d) a third fibrous spacing layer positioned between the third and fourth layers of fine fiber material, the third spacing layer having an efficiency, on its own, for 0.78 micron particles of no greater than 10%;
(e) the first layer of fine fiber material being spaced from the second layer of fine fiber material by a distance of no greater than 254 microns;
(f) the second layer of fine fiber material being spaced from the third layer of fine fiber material by a distance of no greater than 254 microns;
(g) the third layer of fine fiber material being spaced from the fourth layer of fine fiber material by a distance of no greater than 254 microns; and
(h) the first filter media arrangement having an overall efficiency, for 0.78 micron particles, of at least 40%.

2. A filter media according to claim 1 wherein:
(a) said first filter media arrangement has a corrugated configuration.

3. A filter media according to claim 1 wherein:
(a) said first filter media arrangement has a pleated configuration.

4. A filter media according to claim 1 wherein:
(a) the first filter media arrangement is positioned on another region of media.

5. A filter media according to claim 1 wherein:
(a) the fourth efficiency for 0.78 micron particles is greater than the first efficiency for 0.78 micron particles.

6. A filter media according to claim 1 wherein:
(a) the first filter media arrangement has an overall efficiency, for 0.78 micron particles, of at least 60%.

7. A filter media according to claim 6 wherein:
(a) the first filter media arrangement has an overall efficiency, for 0.78 micron particles, of at least 70%.

8. A filter media according to claim 1 wherein:
(a) the third layer of fine fiber material has a third efficiency of no greater than 32.6%.

9. A filter media according to claim 8 wherein:
(a) the fourth layer of fine fiber material has a fourth efficiency of no greater than 32.6%.

10. A filter media according to claim 9 including:
(a) a fifth layer of fine fiber material:
(i) having an average fiber diameter of no greater than 5 microns;
(ii) positioned within said multi-layer composite with the fourth layer of fine fiber material between the third layer of fine fiber material and the fifth layer of fine fiber material; and,
(b) a fourth fibrous spacing layer positioned between the fourth and fifth layers of fine fiber material; the second fibrous spacing layer having an efficiency, on its own, for 0.78 micron particles of no greater than 10%.

11. A filter element for filtering fluids; the filter element including:
(a) filter media including a first filter media arrangement comprising a multi-layer composite and including at least first, second, third and fourth layers of fine fiber material therein:
(i) said first layer of fine fiber material:
(A) having an average fiber diameter of no greater than 5 microns; and,
(B) having a first efficiency, on its own, for 0.78 micron particles of no greater than 25.5%;
(ii) said second layer of fine fiber material:
(A) having an average fiber diameter of no greater than 5 microns; and,
(B) having a second efficiency, on its own, for 0.78 micron particles of no greater than 25.5%;
(iii) said third layer of fine fiber material:
(A) having an average fiber diameter of no greater than 5 microns;
(B) having a third efficiency, on its own, for 0.78 micron particles of no greater than 54.5%; and
(C) being positioned within said multi-layer composite with the second layer of fine fiber material between the third layer of fine fiber material and the first layer of fine fiber material; and
(iv) said fourth layer of fine fiber material:
(A) having an average fiber diameter of no greater than 5 microns;
(B) having a fourth efficiency, on its own, for 0.78 micron particles, of no greater than 54.5%; and,
(C) being positioned within said multi-layer composite with the third layer of fine fiber material between the fourth layer of fine fiber material and the second layer of fine fiber material; and
(b) a first fibrous spacing layer positioned between the first and second layers of fine fiber material; the first fibrous spacing layer having an efficiency, on its own, for 0.78 micron particles of no greater than 10%;
(c) a second fibrous spacing layer positioned between the second and third layers of fine fiber material; the second fibrous spacing layer having an efficiency, on its own for 0.78 micron particles of no greater than 10%;
(d) a third fibrous spacing layer positioned between the third and fourth layers of fine fiber material, the third spacing layer having an efficiency, on its own, for 0.78 micron particles of no greater than 10%;
(e) the first layer of fine fiber material being spaced from the second layer of fine fiber material by a distance of no greater than 254 microns;
(1) the second layer of fine fiber material being spaced from the third layer of fine fiber material by a distance of no greater than 254 microns;

(g) the third layer of fine fiber material being spaced from the fourth layer of fine fiber material by a distance of no greater than 254 microns; and
(h) the first filter media arrangement having an overall efficiency, for 0.78 micron particles, of at least 40%.

12. A filter element according to claim 11 wherein:
(a) said first filter media arrangement has a corrugated configuration.

13. A filter element according to claim 11 wherein:
(a) said first filter media arrangement has a pleated configuration.

14. A filter element according to claim 11 wherein:
(a) the first filter media arrangement is positioned on another region of media.

15. A method of filtering a fluid comprising a step of:
(a) passing a fluid to be filtered through a filter media comprising:
(b) a first filter media arrangement comprising a multi-layer composite and including at least first, second, third and fourth layers of fine fiber material therein:
  (i) said first layer of fine fiber material:
    (A) having an average fiber diameter of no greater than 5 microns; and,
    (B) having a first efficiency, on its own, for 0.78 micron particles of no greater than 25.5%;
  (ii) said second layer of fine fiber material:
    (A) having an average fiber diameter of no greater than 5 microns; and,
    (B) having a second efficiency, on its own, for 0.78 micron particles of no greater than 25.5%;
  (iii) said third layer of fine fiber material:
    (A) having an average fiber diameter of no greater than 5 microns;
    (B) having a third efficiency, on its own, for 0.78 micron particles of no greater than 54.5%; and
    (C) being positioned within said multi-layer composite with the second layer of fine fiber material between the third layer of fine fiber material and the first layer of fine fiber material; and
  (iv) said fourth layer of fine fiber material:
    (A) having an average fiber diameter of no greater than 5 microns;
    (B) having a fourth efficiency, on its own, for 0.78 micron particles; of no greater than 54.5%; and,
    (C) being positioned within said multi-layer composite with the third layer of fine fiber material between the fourth layer of fine fiber material and the second layer of fine fiber material; and
(c) a first fibrous spacing layer positioned between the first and second layers of fine fiber material; the first fibrous spacing layer having an efficiency, on its own, for 0.78 micron particles of no greater than 10%;
(d) a second fibrous spacing layer positioned between the second and third layers of fine fiber material; the second fibrous spacing layer having an efficiency, on its own for 0.78 micron particles of no greater than 10%;
(e) a third fibrous spacing layer positioned between the third and fourth layers of fine fiber material, the third spacing layer having an efficiency, on its own, for 0.78 micron particles of no greater than 10%;
(f) the first layer of fine fiber material being spaced from the second layer of fine fiber material by a distance of no greater than 254 microns;
(g) the second layer of fine fiber material being spaced from the third layer of fine fiber material by a distance of no greater than 254 microns;
(h) the third layer of fine fiber material being spaced from the fourth layer of fine fiber material by a distance of no greater than 254 microns; and
(i) the first filter media arrangement having an overall efficiency, for 0.78 micron particles, of at least 40%.

16. A method according to claim 15 wherein:
(a) said step of filtering comprises filtering a liquid.

17. A method according to claim 15 wherein:
(a) said step of filtering comprises filtering air.

* * * * *

UNITED STATES PATENT AND TRADEMARK OFFICE
CERTIFICATE OF CORRECTION

PATENT NO. : 6,521,321 B2
DATED : February 18, 2003
INVENTOR(S) : Kahlbaugh et al.

It is certified that error appears in the above-identified patent and that said Letters Patent is hereby corrected as shown below:

Column 27,
Line 30, delete "ay" and insert -- may --.

Column 33,
Line 42, before "problem" and insert -- A --.

Column 50,
Line 65, delete "(1)" and insert -- (f) --.

Signed and Sealed this

Twelfth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,521,321 B2
DATED : February 18, 2003
INVENTOR(S) : Kahlbaugh et al.

It is certified that error appears in the above-identified patent and that said Letters Patent is hereby corrected as shown below:

Title page,
Item [63], Related U.S. Application Data, delete "continuation-in-part" and insert -- continuation --.

Signed and Sealed this

Twenty-second Day of February, 2005

JON W. DUDAS
*Director of the United States Patent and Trademark Office*